June 6, 1933.  C. RISTOW  1,913,212
PROCESS AND APPARATUS FOR MANUFACTURING RECEPTACLES
Filed June 26, 1931   16 Sheets-Sheet 1

Inventor
CARL RISTOW
By
Attorney

June 6, 1933.  C. RISTOW  1,913,212

PROCESS AND APPARATUS FOR MANUFACTURING RECEPTACLES

Filed June 26, 1931  16 Sheets-Sheet 2

Inventor
CARL RISTOW
By Hmand & Lackenbach
Attorney

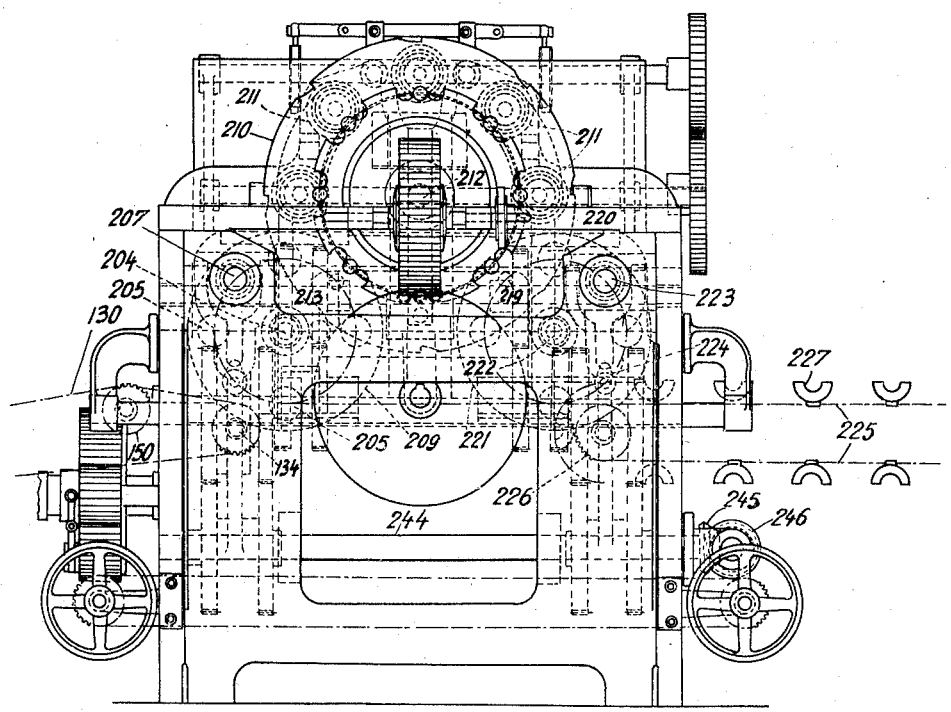

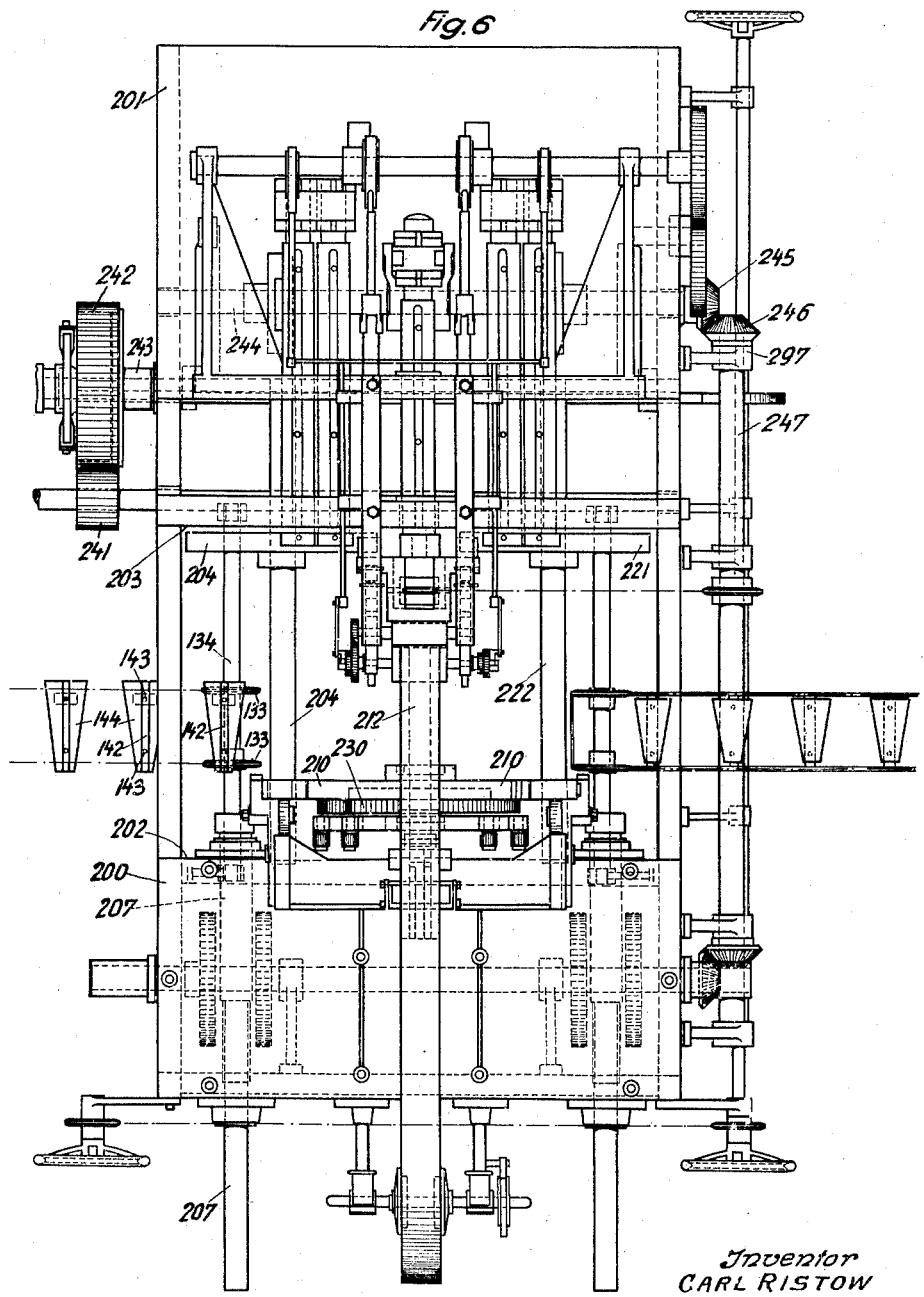

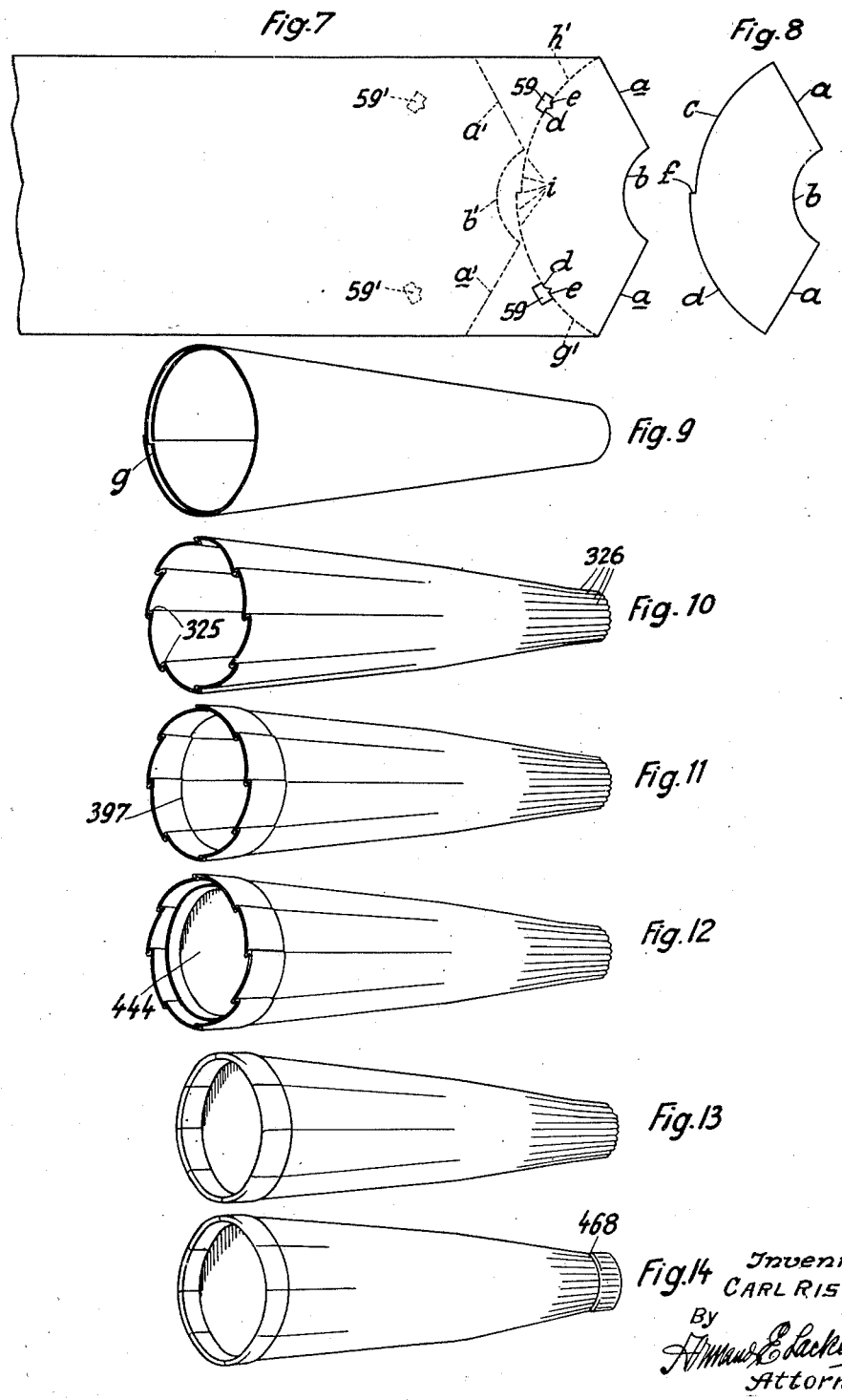

June 6, 1933. C. RISTOW 1,913,212
PROCESS AND APPARATUS FOR MANUFACTURING RECEPTACLES
Filed June 26, 1931 16 Sheets-Sheet 6
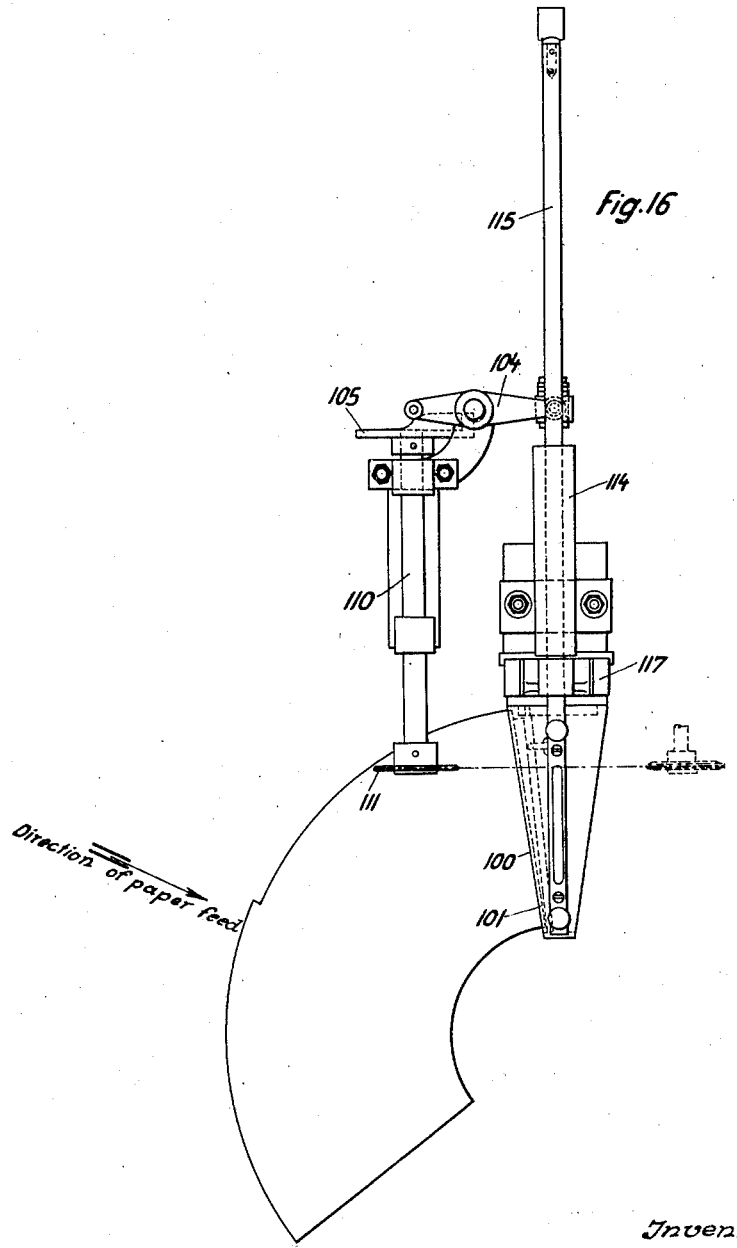
Inventor
CARL RISTOW
By
Attorney

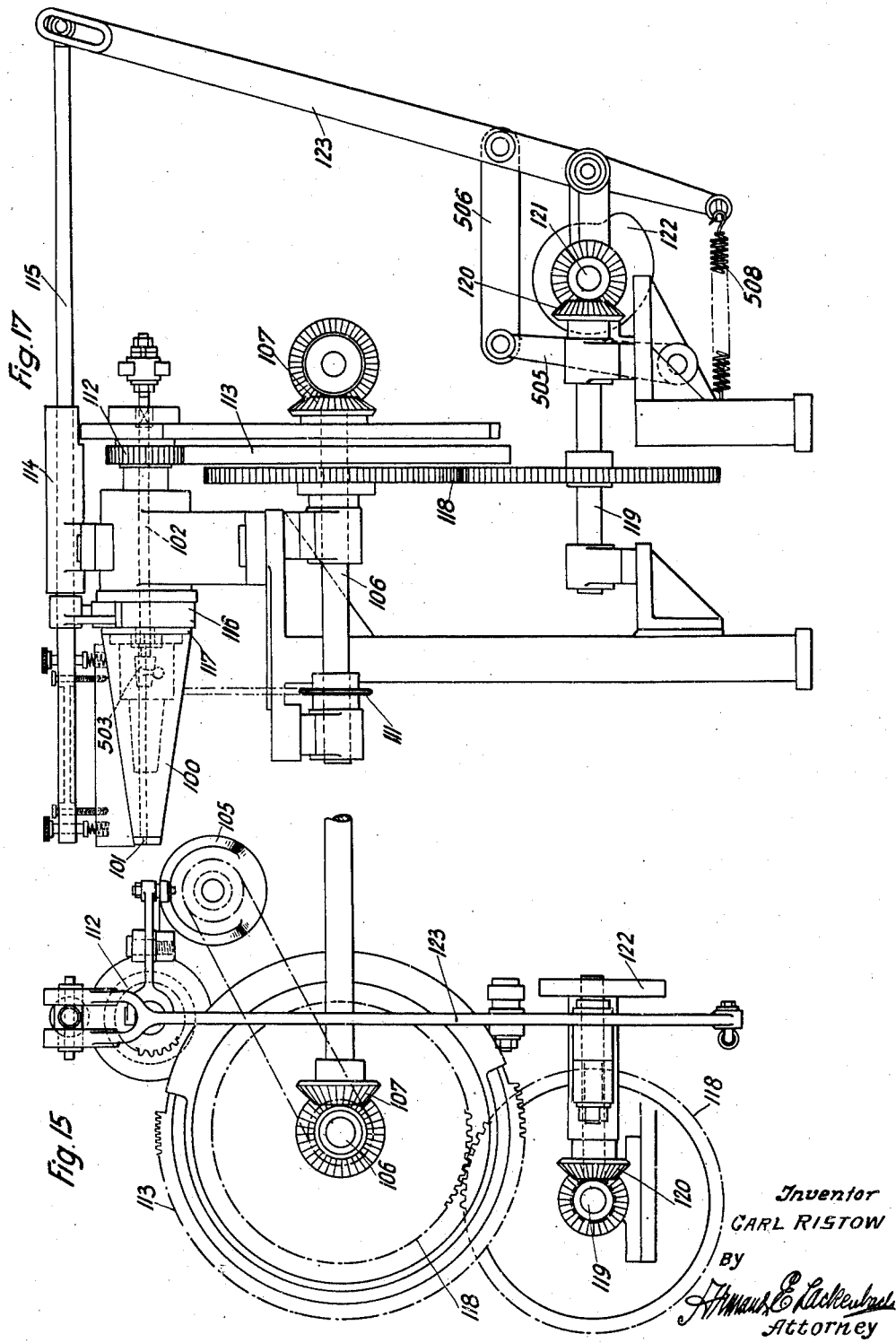

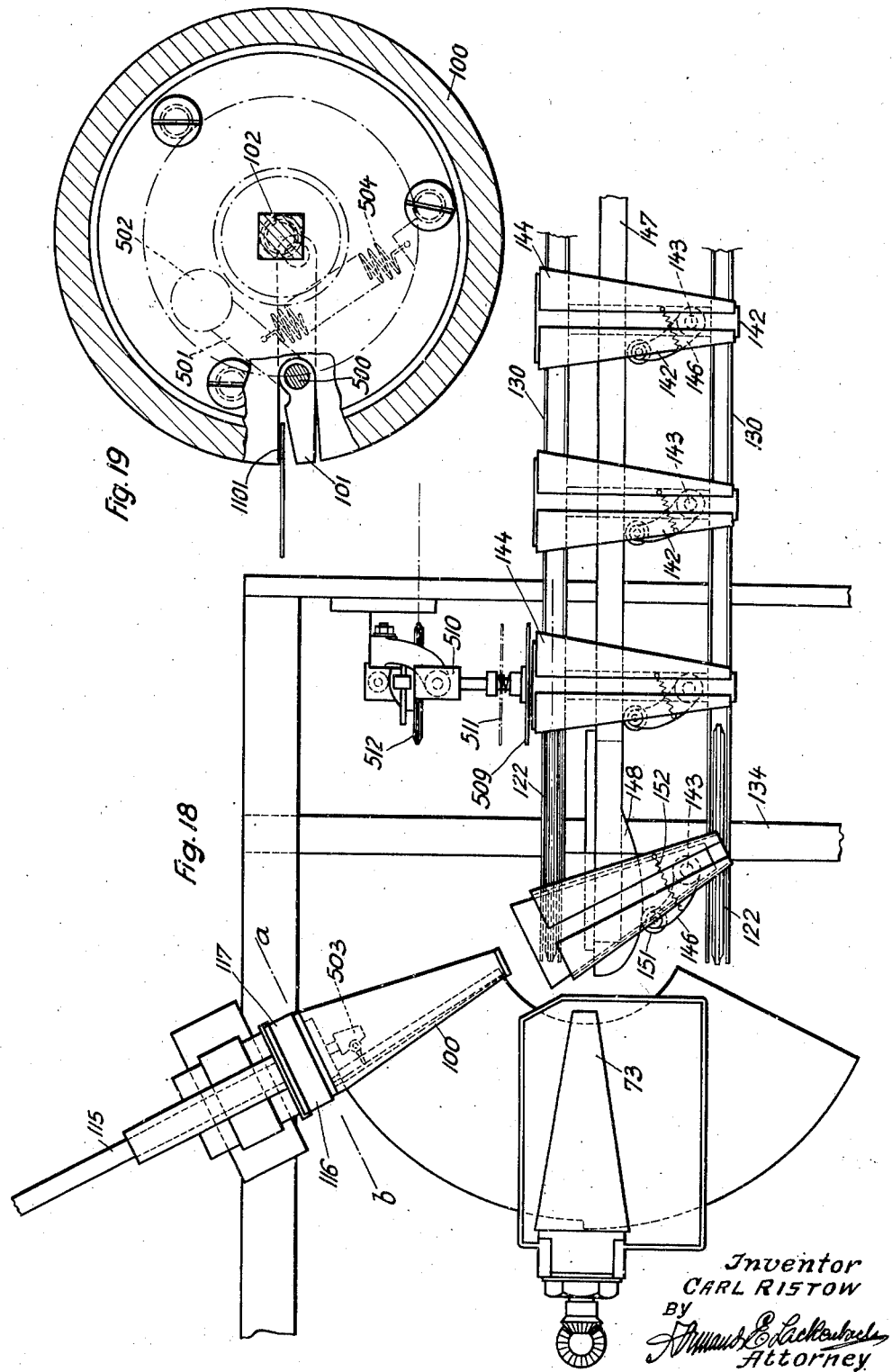

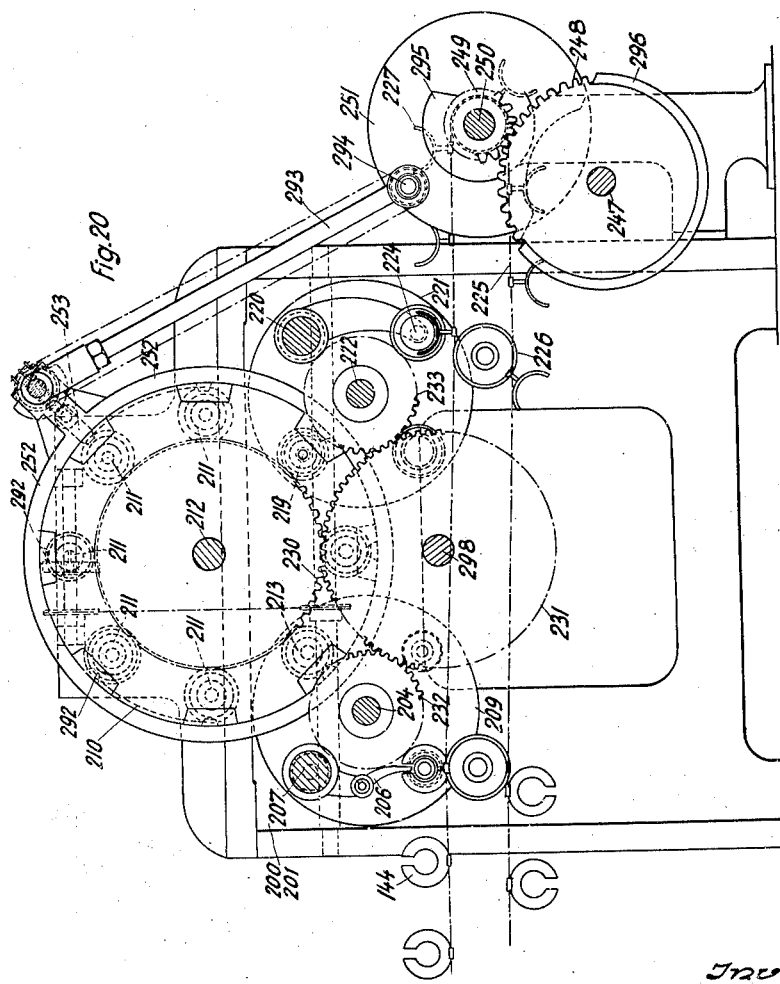

June 6, 1933. C. RISTOW 1,913,212
PROCESS AND APPARATUS FOR MANUFACTURING RECEPTACLES
Filed June 26, 1931 16 Sheets-Sheet 10

Inventor
CARL RISTOW
By
Attorney

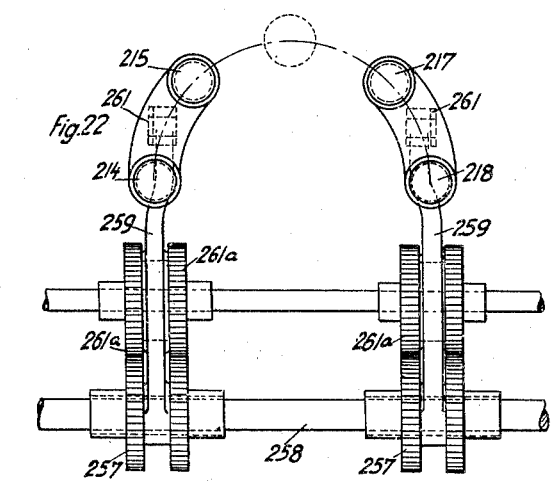
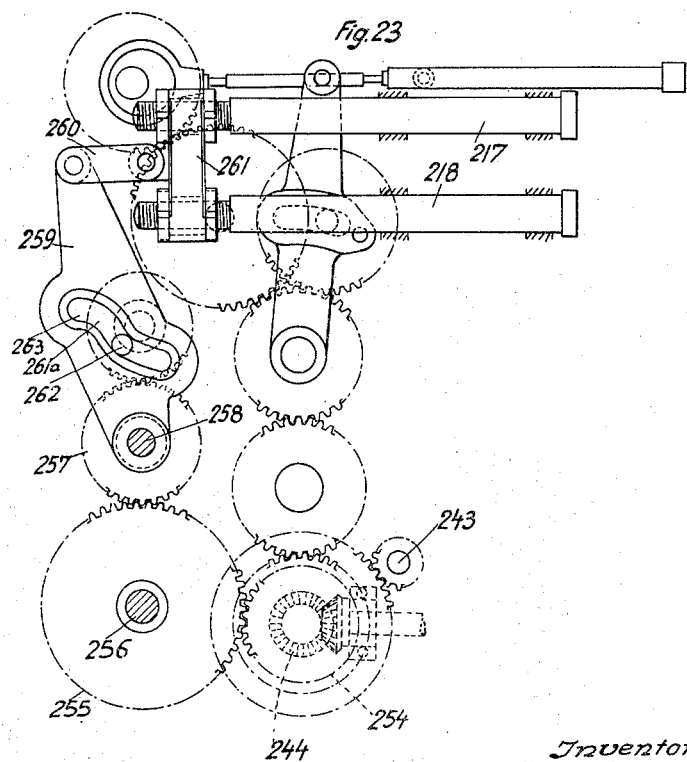

June 6, 1933.  C. RISTOW  1,913,212
PROCESS AND APPARATUS FOR MANUFACTURING RECEPTACLES
Filed June 26, 1931  16 Sheets-Sheet 12
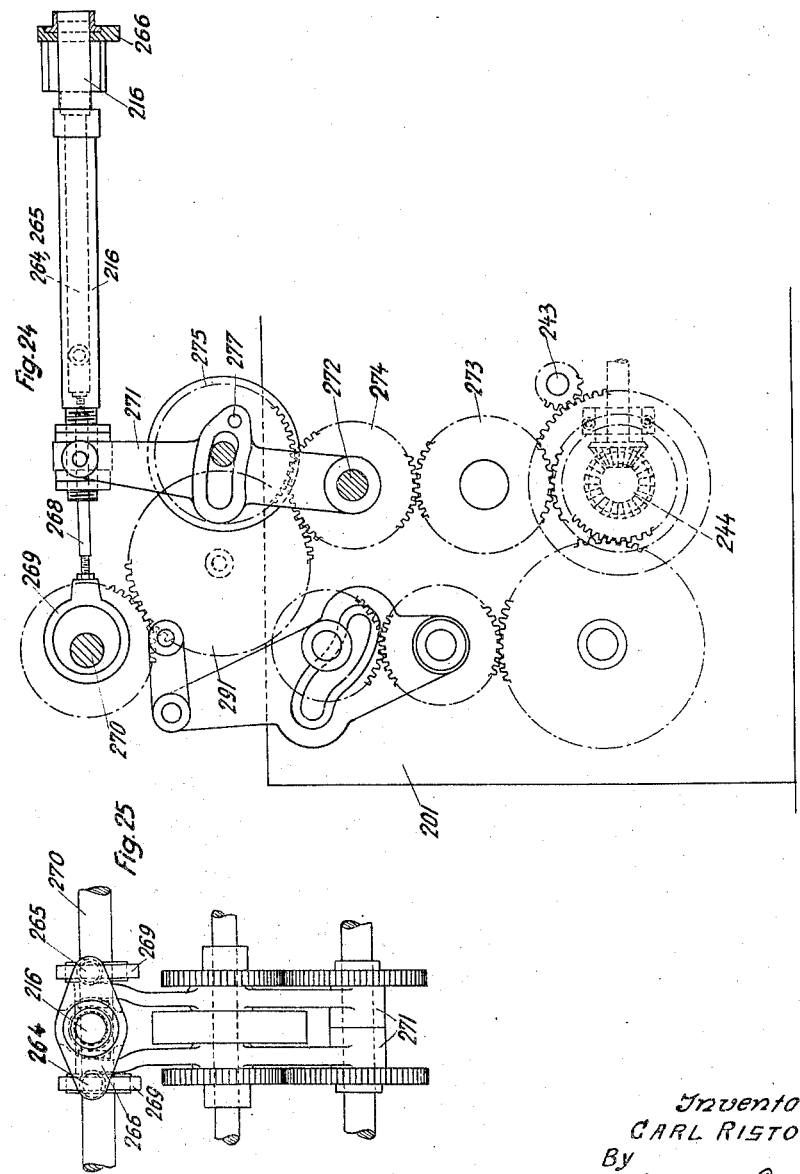
Inventor
CARL RISTOW
By
Attorney June 6, 1933.  C. RISTOW  1,913,212
PROCESS AND APPARATUS FOR MANUFACTURING RECEPTACLES
Filed June 26, 1931  16 Sheets-Sheet 13
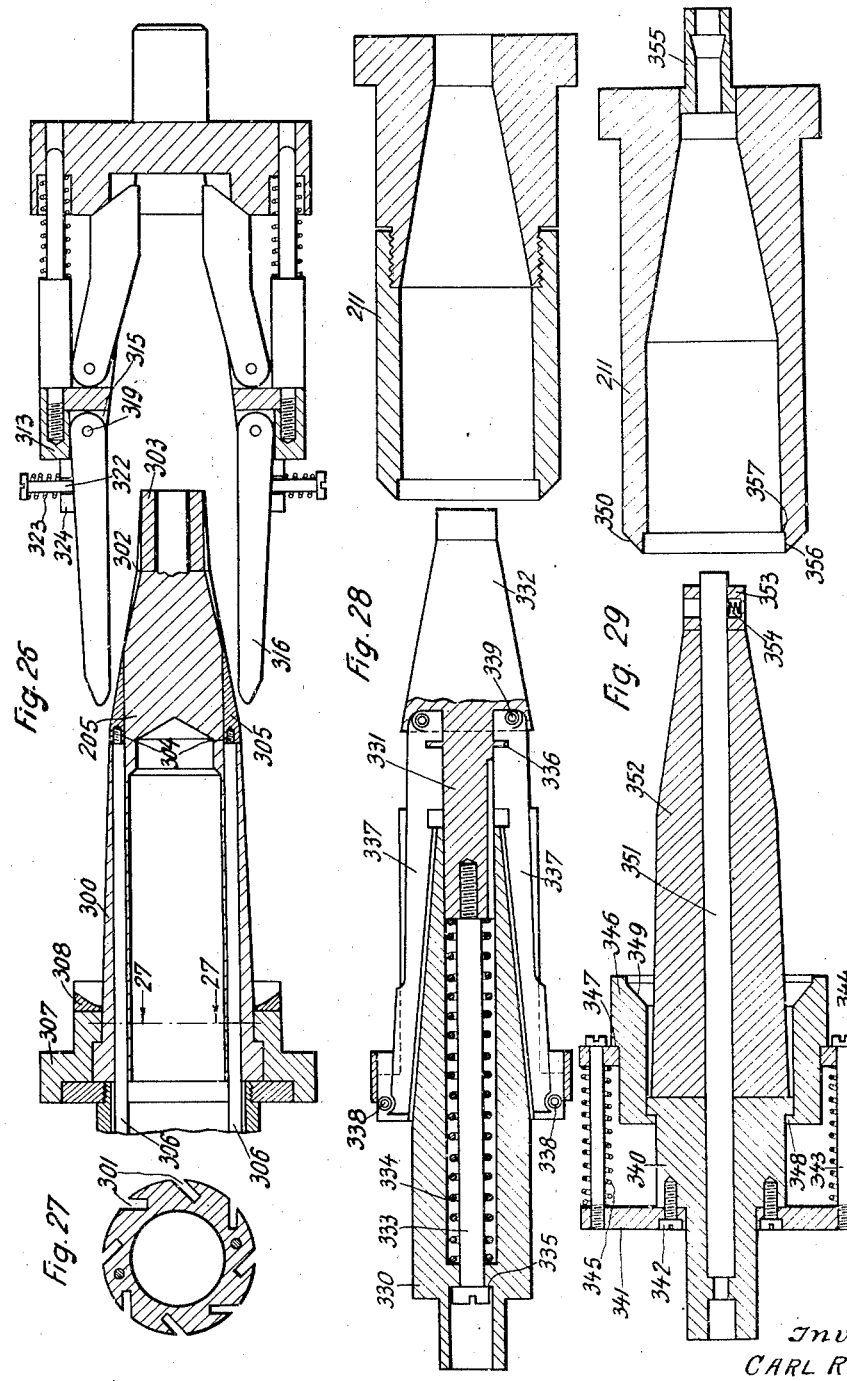
Inventor
CARL RISTOW
By
Armand E Lackenbach
Attorney

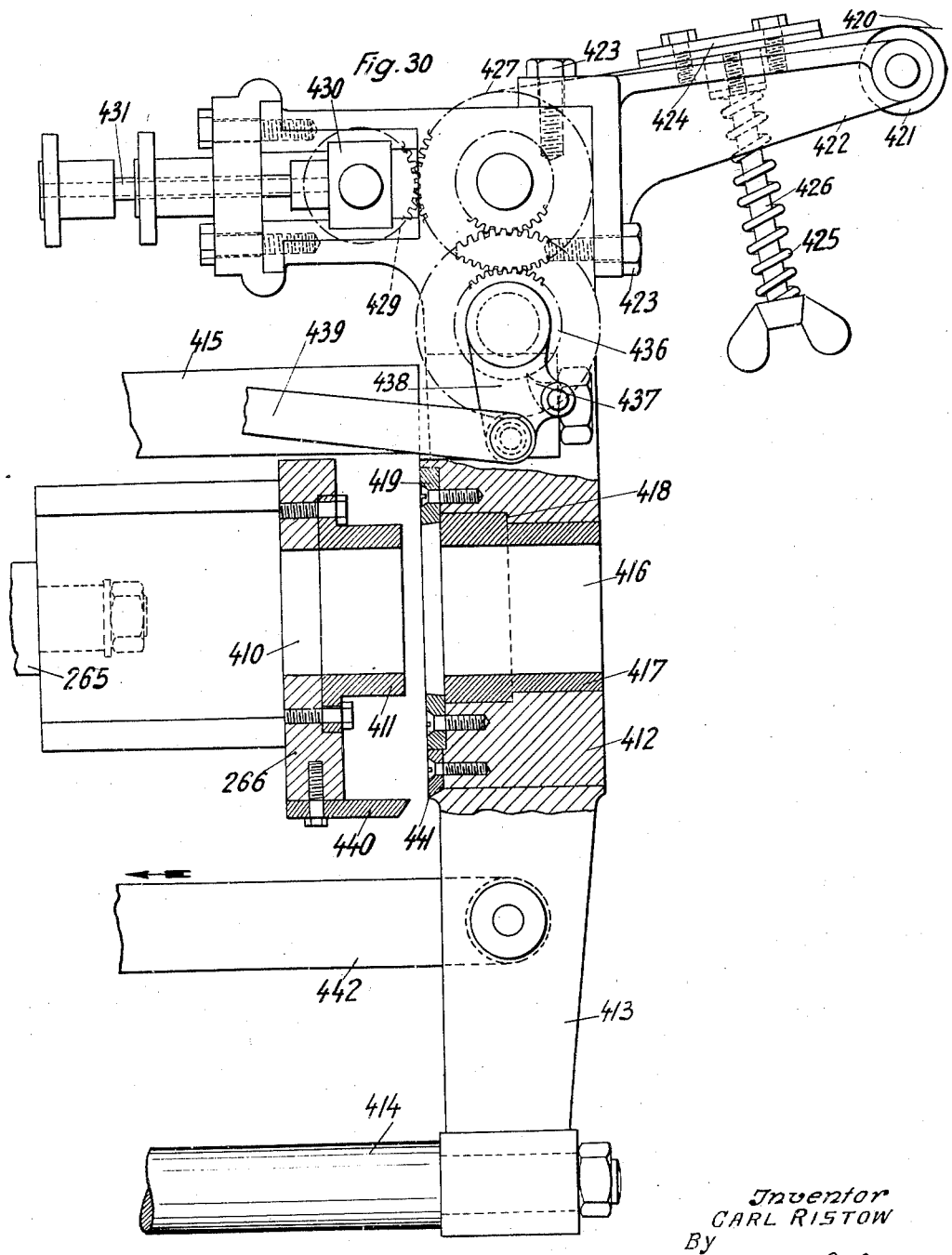

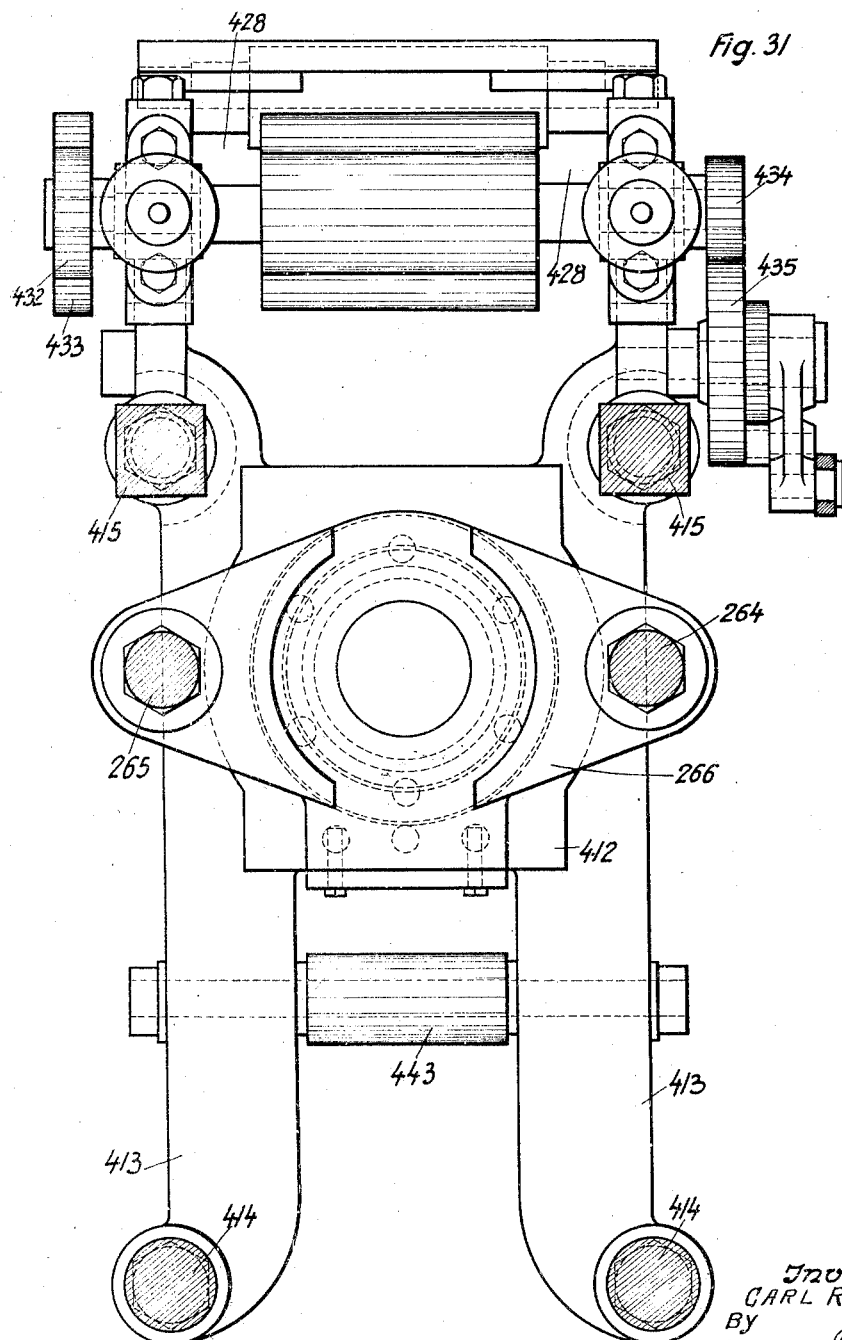

June 6, 1933.  C. RISTOW  1,913,212
PROCESS AND APPARATUS FOR MANUFACTURING RECEPTACLES
Filed June 26, 1931   16 Sheets-Sheet 16

Inventor
CARL RISTOW
By
Attorney

Patented June 6, 1933

1,913,212

UNITED STATES PATENT OFFICE

CARL RISTOW, OF BERLIN, GERMANY

PROCESS AND APPARATUS FOR MANUFACTURING RECEPTACLES

Application filed June 26, 1931, Serial No. 547,010, and in Germany June 30, 1930.

My invention relates to a process and means for manufacturing receptacles, particularly paper bottles, and to the product of such process.

The object of my invention is to provide a receptacle in the shape of an ordinary bottle adapted to be produced from sheet material, more particularly, from a paper web.

Another object of my invention is to provide a process for manufacturing bottles, particularly milk bottles, of sheet material, such as paper, in a rapid and simple manner, preferably in an entirely automatic manner.

Another object is a machine adapted to carry out such a process which shall be simple and inexpensive in construction and efficient in operation.

Further objects of my invention will appear from the description of a preferred form of my novel receptacle and of an embodiment of the machine for carrying out my novel process as illustrated in the accompanying drawings.

Figure 1:
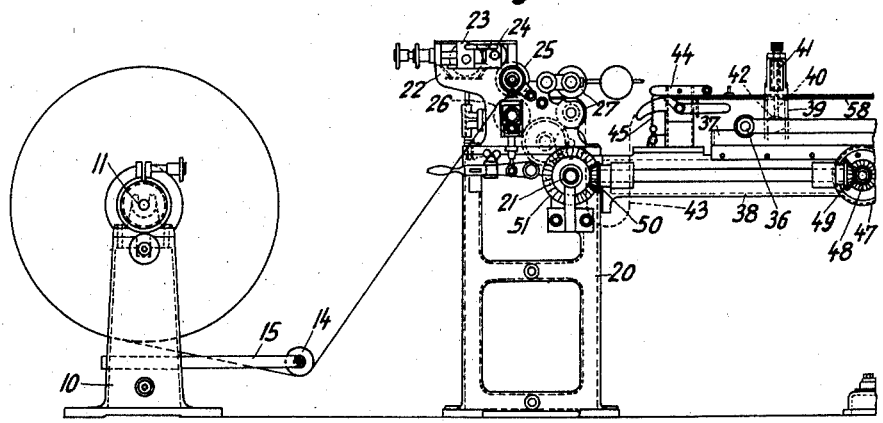
Figure 2:
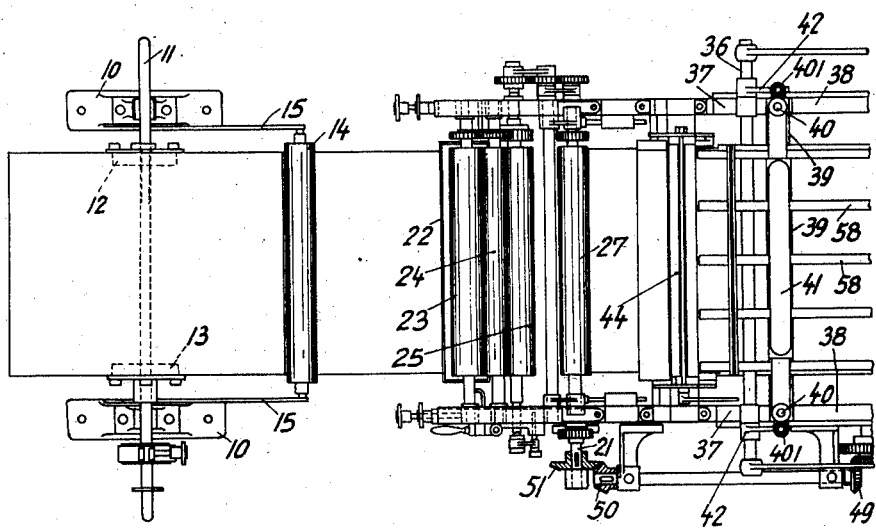
Figure 3:
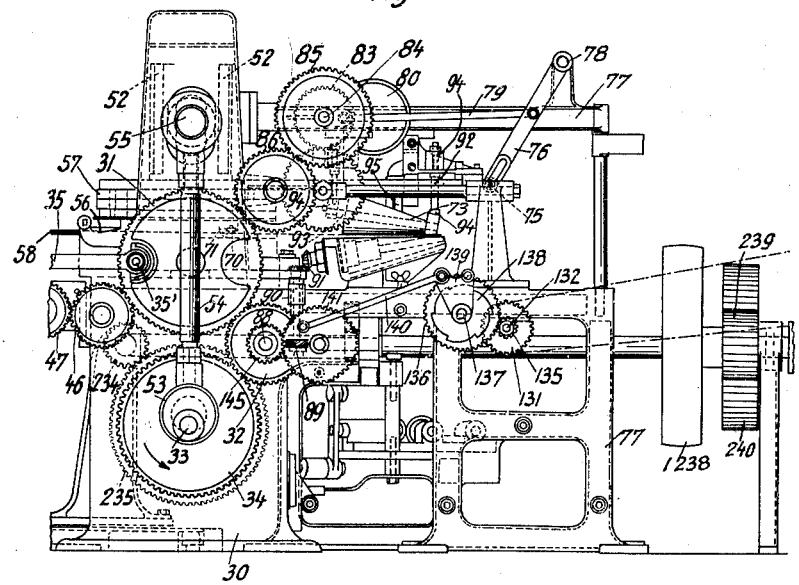
Figure 4:
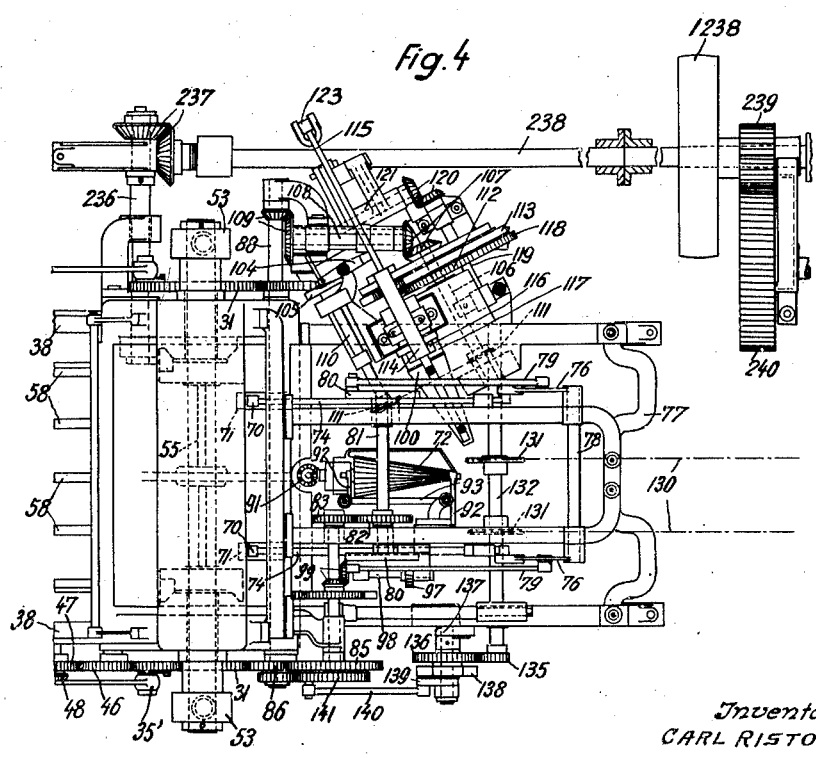

Fig. 1 shows the printing and sheet-feeding mechanism in elevation,

Fig. 2 the plan-view of Fig. 1,

Fig. 3 an elevation of an apparatus for punching the sheet and rolling the same, Fig. 4 the plan-view of Fig. 3, Fig. 5 is an elevation of a mechanism including three revolvers which carry the tools for shaping and finishing the paper bottle, Fig. 6 is the plan-view of Fig. 5; Figs. 3 and 5, or 4 and 6 respectively, are continuations of Figs. 1 or 2 respectively, towards the right.

Figure 21:
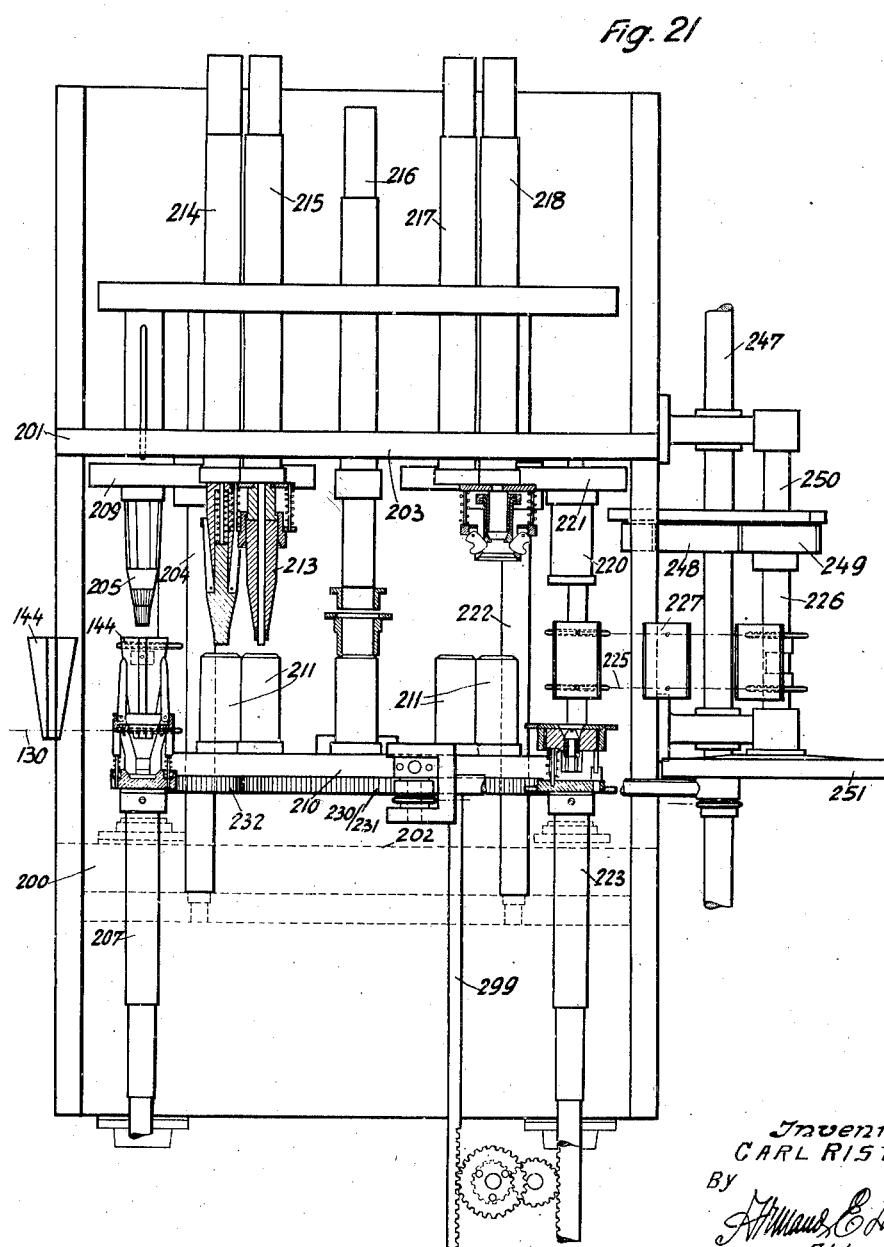
Figure 32:
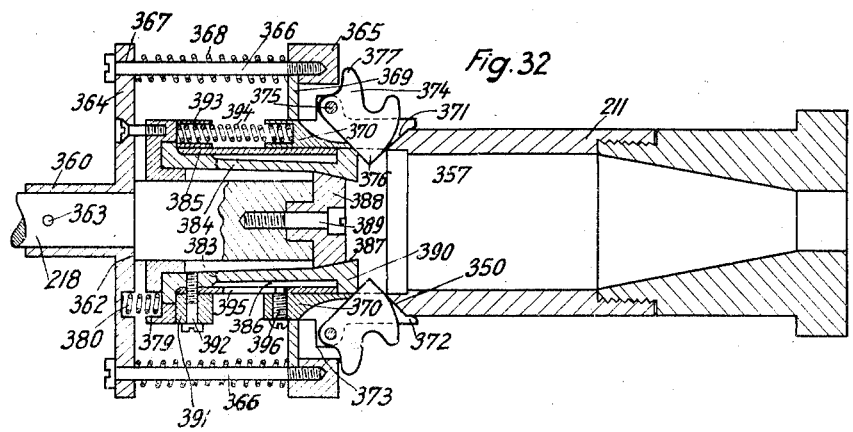
Figure 33:
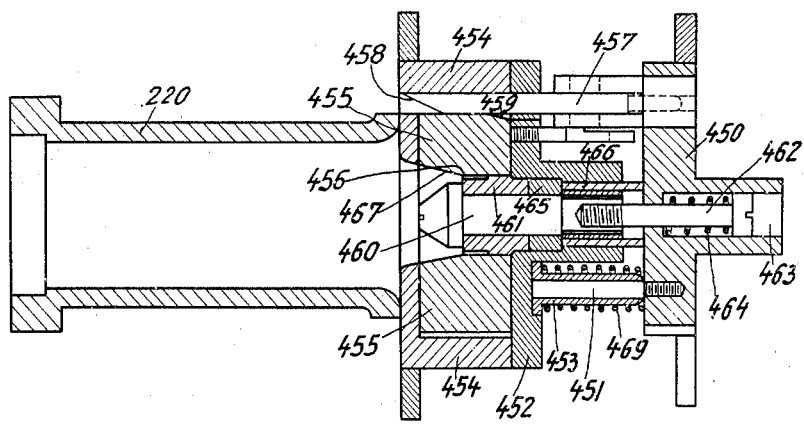

Fig. 7 shows the end of the intermittently fed paper-web, the dotted lines indicating the cut made by the punch, Fig. 8 shows the sheet cut from the web, Figs. 9–14 are prospective views of the paper body in consecutive stages, Fig. 9 showing the conically roller paper body, Fig. 10 the paper body after the preliminary folding operation, Fig. 11 the paper body with the enlarged lower end after the folds have been pressed, Fig. 12 the bottle with inserted bottom, Fig. 13 the bottle with the lower rim inwardly folded over the bottom flange, Fig. 14 the finished bottle, the mouth being enlarged and finished, Figs. 15–25 show details of the machine, Fig. 15 being a detailed view of the means for driving the rolling cone in re-elevation, Fig. 16 a plan-view of the rolling cone with the ejector, Fig. 17 the elevation of Fig. 16 viewed from the right, Fig. 18 a detailed view of the conveyor for the rolled paper sleeves, Fig. 19 a cross-section taken through the rolling cone, Fig. 20 an elevation similar to Fig. 5, some parts being omitted, Fig. 21 the plan-view of Fig. 20 showing the various tools carried by the revolvers, partially in section, Fig. 22 a detail-view of the means for controlling four tools cooperating with the large revolver, the view being a rear elevation with reference to Fig. 5, Fig. 23 a lateral elevation with reference to Fig. 6 viewed from the left, Fig. 24 the mechanism for controlling the fifth tool cooperating with the large revolver for punching, shaping and inserting the bottom disc as viewed from the left with reference to Fig. 5, Fig. 25 the means of Fig. 24 viewed from the right, Figs. 26–33 illustrate the tools which operate on the conically rolled paper sleeve and give the same its final shape in consecutive steps, Fig. 26 illustrating the tool for folding the paper sleeve, partially in axial section, Fig. 27 being the section along line 27—27 of Fig. 26, Fig. 28, partially in axial section, showing a tool for pressing the folds, Fig. 29 illustrating an expandable rubber mandrel for smoothing and finishing the paper sleeve, shown in axial section, Fig. 30 depicts the tool for punching, drawing and inserting the bottom disc into the paper sleeve, Fig. 31 being the elevation viewed from the left with reference to Fig. 30, Fig. 32 represents the tool for folding the lower rim of the bottle over the bottom flange, partially in axial section, and Fig. 33 shows the tool for enlarging and shaping the neck of the bottle and for withdrawing the same from the matrix.

For an easier understanding of my invention, I shall first proceed to describe my novel process broadly.

A paper web is continually withdrawn from a supply roll and is run through a printing machine including printing rollers which print any desired information, such as trademarks, pictures or other data, on the paper web, preferably at such a portion thereof which will be visible on the exterior of the finished bottle and will not be folded in. The printed paper web is intermittently fed into the punch. The cutter of the same is so shaped as to cut out of the web certain portions so shaped that the remainder will be in the form of a segment confined by two radial axes and two concentrical arcs. The segment-shaped sheet is subsequently fed in between two conical rollers one of which is operative to coat half of the sheet with an adhesive and to laterally feed the sheet along an arcuate path to a conical mandrel. This mandrel seizes the radial front edge of the sheet and rolls the same to a frustro-conical sleeve, the wall of which is composed of two plies. A stripper is arranged which pushes the sleeve axially from the rolling cone or mandrel into a receiver sleeve. A number of such receiver sleeves is carried by a conveyor which intermittently feeds the paper cones to the mechanism shown in Figs. 5 and 6, wherein the cone is folded, shaped to bottle-form and finished in the manner which will be described later. In the receiver sleeve the radial rear-edge of the paper sheet which tends to spread apart from the underlying ply, is kept in intimate contact therewith for a time sufficient to be firmly bound thereto by the adhesive. During this period, the adhesive will thoroughly impregnate the paper and render it more pliable which facilitates the subsequent shaping of the paper cone.

The conveyor cooperates with a revolver carrying four identical mandrels and arranged for intermittent rotation. As soon as the receiver sleeve arrives in alignment with one of such mandrels, the paper cone is ejected by suitable means from the receiver sleeve and is slipped onto the mandrel which is kept stationary at this time. Now, the revolver makes a quarter revolution and brings the mandrel to a position opposite to the folding tool proper. The folding tool is equipped with folding fingers which cooperate with slits in the mandrel to provide the paper cone shown in Fig. 9 with the folds illustrated in Fig. 10. The mandrel is preferably heated, for instance by electric current, supplied to the revolver in the customary manner by electric contact brushes. The purpose of heating the mandrel is to render the paper cone more pliable and to dry the adhesive.

Upon completion of this operation, the folding tool is withdrawn and the revolver performs another quarter revolution, whereby the folded paper cone will arrive in alignment with one of eight matrices carried by a large revolver which is intermittently turned through 1/8 revolution. When this position has been reached, the folded paper cone is stripped from the heated mandrel and pushed into the registering matrix. In the subsequent operation, the matrix with the inserted paper body is brought to five consecutive positions in which five suitable tools cooperating with and entering the matrix will give the lower section of the paper cone its final bottle shape. These tools are illustrated in Figs. 28–32.

The first tool, shown in Fig. 28, is axially moved into the matrix and the paper sleeve contained therein and is equipped with members which are spread apart and press the folds firmly on the wall of the matrix, at the same time shaping the neck of the bottle.

The second tool shown in Fig. 29 enters likewise the matrix and the paper sleeve and is formed by a mandrel of an elastic material such as rubber, which is axially compressed and thereby radially expanded so as to firmly press the paper plies on the interior wall of the matrix, whereby the paper plies will be smoothed and will be given their accurate shape. At the same time, the rubber mandrel enlarges the lower end of the bottle so that a shoulder is formed therein, as shown in Fig. 11.

The third tool shown in Figs. 30 and 31 which is arranged in alignment with the highest position of the matrix, serves for punching a bottom disc from a paper web, providing the same with a flange and inserting the flanged disc into the enlarged end of the paper cone so as to abut against and firmly seat on the shoulder provided therein in the preceding operation. Fig. 12 illustrates the bottle at this stage. Preferably, this tool is provided with automatic means disconnecting the punching mechanism in case the large revolver should run idle, that is to say, should not be provided with paper cones.

The fourth tool shown in Fig. 32, operates to fold the lower rim of the paper cone inwardly over the bottom flange and to press it firmly on the inside of said flange.

The fifth tool is formed by a member adapted to firmly press against the folded rim on the bottom flange in order to unite the same. The resulting shape of the bottle is shown in Fig. 13.

When the matrix arrives in the subsequent position, it is in alignment with one of four cylinders carried by a smaller revolver which is likewise intermittently turned through a quarter revolution. In this position, an ejector pushes the bottle out of the matrix and into said cylinder.

When the cylinder arrives in its subsequent position, it cooperates with a plunger which enters into the mouth of the bottle and gives the same its final shape shown in Fig. 14. In the subsequent position, the cylinder containing the finished bottle cooperates with an ejector seizing the mouth of the bottle and pulling the same out of the cylinder and onto a conveyor.

The conveyor may cooperate with a labelling mechanism applying a label to the bottle which may completely surround the cylindrical portion thereof and thus serves incidentally the purpose of re-inforcing the same. Any desired information may be printed on the label either before or subsequent to its operation.

The labelled bottle is preferably conveyed through an impregnating apparatus including a preheating compartment through which the bottles run into the impregnating tank in which they are soaked with molten paraffin and subsequently shaked to remove the surplus of the molten paraffin wax. Subsequently, the bottles are run through compartments of a lower temperature to gradually cool the same and through suitable drying chambers and, if desired, through refrigerating chambers. Finally, the bottles are conducted to the filling machine in which they are filled with milk, beer, or any other beverages or liquids.

If a compact arrangement is desired in order to economize with floor space, I may arrange the impregnating apparatus on top or above the bottle-forming apparatus.

After having described the general principle and operation of my invention, I shall proceed hereinafter to explain the machine in detail with reference to the drawings.

*Paper supply*

As shown in Fig. 1, the standards 10 support the shaft 11 which carries discs 12 and 13; the hubs of these discs are inserted in the central opening of the paper supply roll from both sides thereof. The paper is conducted around a tension roll 14, carried by arms 15 attached to the frame 10.

*Printing machine*

The paper web which is continually withdrawn from the supply roll, may be run through the printing mechanism illustrated in Figs. 1 and 2 for imprinting any desired information on the paper which afterwards will be visible on the outside of the finished bottle. In the frame 20 of the printing mechanism, the main drive shaft 21 is journalled which is geared by suitable spur wheels to a number of cooperating printing cylinders for driving the same. In a container 22 filled with printer's ink, there is journalled a take-up cylinder 23 which transmits the ink to a ductor cylinder 24 which is in contact with the cylinder 25 carrying the electrotype or other printing device. The paper web coming from the tension cylinder 14, is run through between the cylinder 25 and a vertically adjustable cylinder 26 and thence between two feeding rollers 27 which continuously withdraw the paper web from the supply roll and through the various printing cylinders.

*Intermittent conveyor*

From the printing mechanism, the paper is intermittently withdrawn by an intermittent conveyor. This conveyor is driven by a crank disc 31 mounted in the frame 30 of the punch and geared with a spur wheel on the main drive shaft 33 by means of an intermediary gear 32. Preferably, one such crank disc 31 is arranged on either side of the frame 30. Both crank discs have each a crank pin 35' which is connected by a connection rod 35 with a cross-shaft 36 having its ends horizontally guided on beams 38 of the frame by slides 37. The two slides 37 carry a bar 39 which extends transversely beneath the paper web and is provided with borings in its ends which accommodate vertical posts 40 (Fig. 2). Above the paper web, there is slidably mounted on these posts a pressure bar 41 extending parallel to the bar 39 and carrying at each end a depending pin 401. Each of these depending pins may be engaged from below by an arm 42 attached to the cross-shaft 36 which is splined to the connection rods 35 to oscillate therewith. It will be apparent that the pins 401 and the cross-bar 41 to which they are attached, will be lifted when the crank pins 35' pass through the dead-center position on their upward travel, as the crank discs 31 rotate in anti-clockwise direction with reference to Fig. 3. At this time, the slides 37 have arrived at the right-hand end of their stroke with reference to Fig. 1. When the cross-bar 41 is lifted, it releases the paper web and is subsequently turned to the left to the position shown in Fig. 3.

As soon as the cross-bars 39 and 41 have reached this position, the cross-bar 41 is lowered to firmly clamp the paper web against the cross-bar 39. During the subsequent half revolution of the crank discs 31, the paper web is fed towards the right. In order to permit of such intermittent feed, an equallizing loop 43 is provided in the way between the intermittent feeder and the printing device. In order to keep the paper web stationary while the cross-bars 39 and 41 return to the left, a clamping rail 44 is provided which presses the paper web on the frame under the action of a spring 45 and thus frictionally holds the same.

The main drive shaft 21 of the printing device is geared to one of the crank discs 31 by means of spur wheels 46 and 47 and by bevel gears 48, 49, 50 and 51.

The punch

The punch consists of side plates 30 provided with inner guides 52 which guide a vertically reciprocating cutter. The cutter is driven from the main shaft 33 by means of eccentrics 53 and pitmen 54. The upper cutter or knife 57 is carried by a support in which a transverse horizontal shaft 55 is journalled. This shaft projects laterally through slots provided in the side plates 30 and has its end connected to the pitmen 54, whereby the support for the upper knife will be verticaly reciprocated in timed relation to the intermittent paper feed.

The lower knife 56 is stationary and is mounted in the frame constituted by the side plates 30 and suitable transverse plates. The rotation of the eccentrics is so timed in relation to the intermittent feed that any time, the upper knife is in its upper position, the paper web is advanced on parallel horizontal guiding rods 58 and is introduced between the knives.

Subsequently, the upper knife is lowered and cuts the paper web along the dotted lines indicated in Fig. 7. On account of the cut made during the preceding cycle, the paper web has the configuration illustrated in Fig. 7 by full lines. Its front edge is confined by two radial lines $a$ connected by an arc $b$. Two holes 59 have been cut into the web, each of which is confined by an arcuate line $d$ interrupted by an angular recess $e$, the purpose of which will presently be apparent. When the cutter is operated and cuts the paper along the dotted lines, it will be seen that a sheet of the form illustrated in Fig. 8 will be separated from the web. The sheet is confined by the radial lines $a$, the arc $b$ and two arcs $c$ and $d$, as shown in Fig. 8. The arcs $c$ and $d$ are connected by a short radial line $f$. The purpose of this arrangement is to form the lower rim $g$ of the paper cone shown in Fig. 9 of a single ply only, while the rest of the cone is formed by two plies of paper. This facilitates the subsequent folding of the lower rim inwardly over the bottom flange.

The waste portions which the knives cut from the paper web drop into a suitable discharge chute provided in the frame 30.

Thus, it will be understood that the two cooperating cutters comprise two punches for making the holes 59', and three knives for cutting along the lines $a'$, $b'$, $a'$, two knives for cutting along the dotted lines $h$ and one knife for cutting along the dotted line $i$, the latter consisting of two arcuate portions and a radial connecting portion.

Adhesive applying rollers and conical rolling mandrel

The holes 59 which had been punched into the web in the preceding cycle are engaged by hooks 70 which are reciprocated in the feeding direction of the web as described hereinafter. The hooks are provided with slanting front faces 71 (Fig. 3) which enable them, when engaging the front rim $a$ of the paper web, to climb upon the same without injuring it and to slide on the web until they drop into the holes 59. This takes place just before the knives cut off the front end of the web which constitutes the segment-shaped sheet. When the sheet has been cut off from the web, the hooks will move towards the right and engage the angular recesses $e$ (Fig. 7), whereby the sheet is accurately aligned relative to the mechanism described hereinafter.

When the upper cutter has been lifted, the hooks will move the sheet in forward direction in between the conical adhesive-applying roller 72 and the pressure roller 73 cooperating therewith. The hooks 70 are operated by links 74 which are hinged in a suitable manner (not shown) to a transverse rod 75. This rod is carried by the lower ends of two rocking levers 76 which are journalled on a transverse shaft 78 firmly mounted in the frame 77 and are rocked to and fro by cranks 79 (Fig. 4) attached to the crank pins of discs 80, as illustrated in Fig. 4. The shaft 81 of these discs is horizontally journalled in the frame of the machine and is driven by means of spur gears 82 and 83 from a drive shaft 84 which carries a gear 85 at its end. Motion is transmitted to this gear from the toothed crank pin 31 through the intermediary of a gear 86. The adhesive-applying roller 72 of cone-shape is mounted within a container 87 filled with the adhesive. Its shaft is arranged in inclined position, as shown in Fig. 3, and is continuously rotated by the following means: On shaft 88 of the gear 32 there is mounted a helical gear (not shown) which meshes with a helical gear 89 (Fig. 3) carried by a vertical shaft 90. The latter is geared to the shaft of the adhesive-applying roller 72 by means of bevel-gears 91. The adhesive-applying roller 72 and the pressure roller 73 cooperating therewith have their axes arranged in the vertical central plane of the machine so that the central line of the segment-shaped sheet will be brought between the two rollers. The pressure roller 73 may be lifted and is kept in its upper position until the sheet has been introduced. Then, the pressure roller is lowered and presses the sheet on the continuously rotating roller 72.

The lifting and lowering of roller 73 is controlled in the following manner: The roller is mounted within a frame 92 which is arranged to be swingable about a shaft 93 carried by depending arms 94 of the frame and provided with a follower 95 adapted to be engaged from above by a suitable cam. The cam is driven by suitable gears from the spur gear 97 on a shaft 98 which is geared to the shaft 84 by bevel gears 99. Thus, it will be apparent that the pressure roller 73 is intermittently lifted and lowered in timed relation to the operation of the feeding hooks 70.

When the pressure roller 73 has been lowered, it presses the interposed sheet on the rotating adhesive-applying roller so that the latter moves the sheet along an arcuate path towards the rolling cone 100. At the same time, one half of the sheet is coated on its lower surface with adhesive. A cross-section of the rolling cone 100 is shown in Fig. 19. The rolling cone 100 is provided with a longitudinal recess accommodating a pivoted clamping member 101 which is so turned that it may firmly clamp the front edge $a$ of the sheet against the wall 1101 of the recess.

The clamping member 101 is operated as follows: Its shaft 500 carries an arm 501 provided with a follower 502 which bears against a conical member 503 illustrated in Fig. 18. The member 503 is mounted on a push-rod 102 of rectangular cross-section which is shiftably and nonrotatably guided in the rolling cone and adapted to be longitudinally reciprocated so as to rock the arm 501 and the clamping member 101 connected thereto. A spring 504 extends between the arm 501 and a suitable stud and tends to keep the follower 502 in engagement with the conical member 503.

The push rod 102 is operated by a rocking lever 104 (compare Fig. 16) carrying a follower which engages a cam disc 105. The cam disc is rotated in the following manner:

The main drive shaft 106 for the rolling cone is journalled in the machine frame parallel to the axis of the rolling cone, that is to say, in horizontal position, but at an angle to the longitudinal central plane of the machine. This shaft is driven from the shaft 88 by means of bevel gears 107, a shaft 108 and bevel gears 109 (Fig. 4). The drive shaft 106 is operatively connected to the shaft 110 carrying the cam disc 105 through the intermediary of a chain and sprocket wheels 111, as shown in Fig. 4.

When the sheet has been seized by the clamping member 101 of the rolling cone, the latter is rotated and rolls the sheet to frustro-conical shape, the adhesive face of the sheet arriving between the two plies so that the inner and the outer surface of the frustro-conical paper sleeve will be free from adhesive.

The rolling cone is intermittently driven in the following manner:

A gear 112 (Fig. 17) splined to its shaft is adapted to mesh with an intermittent gear 113. A portion of the periphery of gear 113 is provided with teeth, whereas the other portion is smooth so that the gear 112 will be intermittently driven even though the gear 113 may continuously rotate.

The gear 113 is mounted on the drive shaft 106.

The bracket mounted on the machine frame which carries the rolling cone and the driving gear thereof, supports a horizontal sleeve 114 (Figs. 4 and 17) which guides an ejector rod 115 above and parallel to the axis of the rolling cone. The rod 115 carries an annular member 116 surrounding the end of larger diameter of the rolling cone. The end 117 which is of cylindrical shape, is surrounded by the annular member, while the sheet is rolled on the cone. Therefore, the rim of the paper sleeve will be positioned in front of the end face of this annular member. When the sheet has been rolled up, the clamping member 101 is released and the annular member 116 is axially moved by the ejector rod 115 over the rolling cone thereby stripping the paper sleeve therefrom. The push rod 115 is controlled by the following means:

As shown in Fig. 17, the shaft 119 extends parallel to the main drive shaft 106 and is geared thereto by the spur wheels 118. A horizontal shaft 121 is geared to shaft 119 by bevel gears 120 and carries at its end a cam 122 adapted to actuate a rocking lever 505 connected by a link 506 to a double-armed lever 123 pivoted to the machine frame and maintained in operative relation to the cam 122 by a spring 508. The upper end of lever 123 is linked to the push rod 115 whereby the same will be reciprocated in timed relation to the revolution of the rolling cone 100 and to the actuation of the clamping member 101.

*Conveyor for the paper sleeves*

An endless chain conveyor extends from the frame 77 of the sheet-rolling mechanism, shown in Figs. 3 and 4, to the section of the machine carrying the revolvers which give the rolled sheet its final form. The conveyor consists of two chains 130 running over sprocket wheels 131 of a shaft 132 (Fig. 3) and over sprocket wheels 122 of a shaft 134, Fig. 5. Moreover, a guiding sprocket 150 is provided (Fig. 5).

The chains are driven by shaft 132 journalled in frame 77 in an intermittent manner. For this purpose, a spur gear 135 is attached to the shaft 132 and is in mesh with a gear 136 which is rotatably carried by a horizontal pivot 137 attached to frame 77. This pivot carries a ratchet wheel 138 connected with gear 136. A pawl-carrier 139 (Fig. 4) is arranged on the pivot 137 and adapted to be rocked by a connection rod 140 attached to a crank disc 141. The latter is mounted in frame 30 and provided with peripheral teeth meshing with the spur wheel 145 splined on shaft 88. The pawl carrier 139 is provided with a suitable pawl (not shown) which is adapted to intermittently turn the ratchet wheel 138 in anti-clockwise direction. Thus, the chain conveyor 130 is intermittently operated.

The chains 130 are connected by transverse spacing bars 142 each provided with a pivot 143 extending perpendicularly to the plane of the two parallel chains (Fig. 18). On these pivots 143 there are rotatably supported conical sleeves 144 of sheet material which are slit along the upper mantle line and shaped to receive the rolled paper sheet. Each receiver sleeve 144 has an arm 146 provided with a follower 151 (Fig. 18). A spring 152 attached to the arm and to the bar 142 tends to keep the follower 151 in contact with the cross bar 142. In this position, the axis of the receiver sleeve extends perpendicularly to the chains as shown in Fig. 18. A cam 147 is arranged coextensive with the chains and between the same and is provided with the cam face 148 extending into path of the follower 151. Therefore, the follower will abut against the cam and will be displaced, whereby the receiver sleeve is angularly positioned so as to be in axial alignment with the rolling cone 100, compare Fig. 18. At the time, when the ejector rod 115 is advanced to strip the paper cone from the rolling cone, one of the receiver sleeves is in exact alignment and at rest and will directly receive the stripped paper sleeve.

If desired, a push plate 509 may be arranged adjacent to the conveyor as indicated in Fig. 18, in order to push the paper cone firmly into the receiver sleeve. The push plate 509 is guided axially in a bracket 510 and is reciprocated in axial direction by any suitable means so as to move out of the way to the position indicated at 511, when the conveyor is advanced one step and to subsequently go forward to push the paper cone into the receiver sleeve. The means for reciprocating the push plate 509 may comprise a cam disc 512 or any other suitable means.

Revolver carrier

The frame carrying the revolvers consists of two box-shaped frames 200 and 201 (Figs. 5 and 6), the opposed faces 202 and 203 of which enclose a space in which the cooperating tools for shaping the paper cone are arranged. The frame castings 200 and 201 enclose the gearing and operating mechanism for moving the revolvers and the tools cooperating therewith.

A horizontal shaft 204 journalled within the castings 200 and 201 carries the revolver disc 209. Four mandrels 205 of the same shape and construction are mounted on the disc 209 and are circumferentially distributed thereon extending parallel to the shaft 204. One of these mandrels 205 is shown in Fig. 21. In Fig. 6, however, the mandrels have been omitted in order to simplify the drawing. The points, however, in which the mandrels are mounted on the disc 209, have been indicated in Fig. 5 by dotted circles. By suitable means to be described later, the shaft 204 is intermittently turned a quarter revolution. Any time it is at rest, one of the four mandrels has arrived in alignment with a receiver sleeve 144, as shown in Fig. 21. An ejector finger 206 (shown in Fig. 20) is attached to a rod 207 guided in the casting 200 to be axially movable in a direction transverse to the conveyor chains 130. The rod is so reciprocated that the ejector finger 206 engages behind the rim of the paper cone situated within the receiver sleeve and ejects the paper cone out of the receiver sleeve and upon the mandrel 205. As shown in Fig. 20, the ejector finger 206 is guided within the slit provided in the receiver sleeve 144.

When the ejector finger 206 has returned to its initial position, the revolver disc 209 performs a quarter revolution. This brings the mandrel provided with the paper cone in position opposite to a tool-carrying rod 207 which is axially guided in the casting 200 and carries the folding tool which will be described later. As soon as the mandrel 205 arrives in alignment with the rod 207, the latter is advanced and subsequently withdrawn, whereby the paper cone is automatically folded, as shown in Fig. 10. When the rod 207 has been withdrawn, the disc 209 performs another quarter revolution and thus brings the folded paper sleeve into the cooperative position with one of the matrices 211 carried by the large revolver disc 210. While the matrices have not been shown in Fig. 6 for sake of a clearer illustration, they are indicated by dotted lines in Figs. 5 and 20 and are shown in plan in Fig. 21. The shaft 212 of the disc 210 extends parallel to shaft 204 and is suitably mounted in the casting 200. By means to be described later, the large revolver disc 210 is intermittently turned through ⅛ revolution. It is situated adjacent to the casting 200 and carries circumferentially distributed eight matrices arranged parallel to the shaft 212 and opening towards the smaller revolver discs 209 and 221. Each mandrel 205 is provided with an axially movable ejector which is operated as soon as the mandrel arrives in alignment with a matrix 211 (Fig. 21) and strips the folded paper sleeve from the mandrel 205 and into the matrix 211 which successively presents the folded paper cone to the various tools which will be described later.

I may mention at this time, however, that each of these tools, five altogether, is carried by a rod which is axially guided in the casting 201 in a direction parallel to the axis of the revolver discs, and is automatically reciprocated in timed relation to the intermittent turn of the revolver disc 210 so as to engage the matrices carried thereby, while the same are at rest. For this reason, the five rods 214, 215, 216, 217, 218 are in alignment with the positions which the matrices 211 assume in Fig. 5, see Fig. 21. As soon as the paper sleeve arrives in the position indicated at 219 in Fig. 5, a reciprocatory ejector rod 299 (Fig. 21) guided in the casting 200 enters the matrix from the rear and pushes the bottle-shaped paper sleeve out of the matrix 211 and into one of four receiving cylinders 220 which are circumferentially distributed and mounted on the revolver disc 221 parallel to the shaft 222 thereof. The latter is journalled in the casting 201 and situated at the same level as the revolver shaft 204. The revolver disc 221 is likewise intermittently turned a quarter revolution and is situated in the same vertical plane as the revolver disc 209 so as to successively bring its cylinders 220 in front of the position indicated at 219, in which the cylinder is charged with the paper sleeve. The charged cylinder subsequently arrives in front of the mouth-shaping tool carried by a reciprocating rod 223 guided in the casting 200 (Fig. 21).

After the next step, the cylinder 220 containing the finished paper bottle arrives in cooperative position relative to a rod 224 which reciprocates in unison with the rods 223 and enters the cylinder 220 on its forward stroke to engage the mouth of the finished bottle and to withdraw the same from the cylinder. The bottle is thus placed on an endless conveyor chain 225 which conveys the finished bottles to the labelling machine and thence through the impregnating mechanism (not shown). The conveyor chain 225 is carried by an intermittently driven sprocket wheel 226 and is provided with sheet-metal cups 227 which are successively brought to position in front of the cylinder 220 cooperating with the ejector rod 224.

When the latter pulls a finished bottle out of the cylinder, the shoulder on the lower end of the bottle gets caught by the rim of the cup 227 and is retained by the latter, while the ejector continues its rearward stroke.

The three revolver discs are simultaneously turned and are kept stationary for the same period of time. During this period, the rods 214–218, 207 and 223, 224 move forward and rearward in unison.

*Intermittent drive of the revolver discs*

A gear 230 is coaxially attached to the large revolver disc 210 and is in mesh with a gear 231 journalled in the casting 200 on a shaft 298 below, and parallel to, the shaft 212. The gear 231 is in mesh with gears 232 and 233. The former is splined to the shaft 204 of the revolver disc 209 and the latter is splined to the shaft 222 of the revolver disc 221.

The drive shaft 33 of the punch is driven through the intermediary of transmission gears 234 and 235 (Fig. 3) from a shaft 236 having its free end geared to a horizontal main shaft 238 by means of bevel gears 237. The main shaft 238 carries a pulley 1238 to which the power for operating the entire machine is supplied. The main shaft 238 driven by the pulley operates on a transmission gear consisting of pinions and gears 239, 240, 241, 242 (Figs. 4 and 6) which transmit the power to a revolver drive shaft 243. This shaft extends in longitudinal direction and is horizontally journalled in the casting 201. From the shaft 243 rotation is transmitted by suitable means (not shown) to a parallel shaft 244 (Fig. 6) likewise journalled on the casting 201, compare Fig. 23. The end of shaft 244 projects through the wall of the casting 201 and carries on its end a bevel gear 245 which is in mesh with another bevel gear 246 of a horizontal shaft 247 journalled in brackets 297 (Fig. 6). The shaft 247 carries an intermittent gear 248 having a partially toothed periphery. This intermittent gear which has been illustrated in Figs. 20 and 21, but has been omitted in Figs. 5 and 6, is in mesh with a pinion 249 mounted on a parallel shaft 250 (Figs. 20 and 21).

Thus, the shaft 250 is intermittently rotated. In order to keep the shaft 250 stationary, while its gear is out of mesh with the teeth of the intermittent gear, locking discs 296 and 295 are splined on shafts 250 and 247. Shaft 250 carries a crank disc 251 (Fig. 20) having a crank pin 294. A connection rod 293 is mounted on this crank pin and linked to a ring 252 which is seated on the periphery of the large revolver disc 210. A pawl 253 carried by the ring and adapted to engage recesses 292 in the periphery of the revolver disc is so controlled as to clutch the latter to the ring any time the ring is turned by the crank in clockwise direction with reference to Fig. 20. In this manner, the larger revolver disc is intermittently turned and imparts rotation to the small revolver discs.

It will be understood, of course, that any time the pinion 249 is driven, it performs one complete revolution to advance the revolver discs one step.

*Operation of the tool-carrying rods and the ejector rods*

The shaft 244 (Fig. 23) imparts rotation to a parallel shaft 256 by intermeshing gears 254 and 255. The shaft 256 is geared to another parallel shaft 258 by the spur wheel 255 and a gear 257. On shaft 258 there are pivoted two levers 259, Figs. 22, 23, which are rocked in the manner described hereinafter. Each of them has its upper end connected by a link 260 to a cross-head 261, one crosshead uniting the rods 214 and 215, while the other cross-head unites the rod 217 and 218 for common reciprocatory movement.

Each of the levers 259 is rocked by two crank discs 261a which are connected with one another by an eccentric crank pin 262. This pin passes through a curved slot 263 provided in the respective lever 259. The crank discs 261a have a toothed periphery and mesh with the afore-mentioned gears 257. Owing to their rotation, the levers 259 will be oscillated.

The rods 207 and 223 are reciprocated by suitable means which are similar to those just described and, therefore, need not be shown and explained in detail.

The tool for punching, drawing and inserting the bottom disc is arranged between the rods 215 and 217 and driven by a main rod 216 and two auxiliary rods 264 and 265 guided parallel to the main rod 216. The function of these and of the rod 216 will be described later with reference to Figs. 30 and 31. At this point, however, the means for reciprocating these rods will be explained. The two rods 264 and 265 are connected to a cross-head 266 (Fig. 25) and are guided in the casting 201 parallel to the main rod 216. The rearward ends of the rods 264 and 265 are each hinged to a pitman 268 of an eccentric 269 mounted on a shaft 270 to which rotation is imparted from the shaft 244 by intermediary gears 273, 274 and 291 (Fig. 24).

The rod 216 is reciprocated by means of a rocking lever 217 attached thereto. The rocking lever 271 is mounted on a shaft 272 and provided with a slot through which the shaft of a gear 275 extends. The latter meshes with the gear 274 and is provided with a suitable cam groove (not shown) which is in engagement with a follower pin 277 projecting from the lateral face of the lever 271 whereby the latter is reciprocated in timed relation to the rotation of the gear 275.

*The folding tool and the mandrel cooperating therewith*

Fig. 26 illustrates an axial section through the folding mandrel 205. A slightly conical sleeve 300 which is made hollow for the reduction of its weight is provided with eight longitudinal saw-cuts 301 tangentially directed relative to an imaginary cylinder coaxial with the mandrel. The diameter of the front portion of the sleeve 300 is reduced and the end thereof is provided with a plurality of grooves, say 24, indicated at 302. As the extreme end portion 303 is nearly cylindrical, it is preferably made of a separate piece and attached to the member 300 in any suitable manner. Moreover, the sleeve 300 is formed with a peripheral groove 304 of rectangular cross-section which accommodates an ejector or stripper ring 305 attached to rods 306 which are guided in suitable longitudinal borings provided in the sleeve 300. A separate flanged ring 307 is attached to the bottom portion of the sleeve 300 and carries at its front an annular member 308 of hardened steel.

The folding tool proper which is carried by the rod 207 consists of a cross-head 310 attached thereto and provided with a number of borings 311 adapted to accommodate pins 312 which carry an annular member 313. Coiled springs 314 inserted between shoulders on the pins 312 and the cross head 310 tend to keep the annular member 313 at a predetermined distance from the cross-head. The inner periphery of the annular member 313 is formed with eight cam slots 315 extending in planes parallel to the slots 301 and adapted to guide and accommodate folding fingers 316. In a similar manner, a plurality of folding fingers 317 corresponding in number to the grooves 302 are guided in radial cam slots 318.

The folding fingers 316 and 317 are mounted on pivots 319 and 320 as shown in Fig. 26. The ends of all of the folding fingers are bevelled and adapted to cooperate with the annular member 308 and a conical face 321 provided on the cross-head 310.

Projections of the annular member 313 carry radial pins 322 surrounded by coil-springs 323 which bear against followers 324 tending to urge the folding fingers 316 in inward direction.

The operation is as follows:

When the rod 309 is axially advanced toward the mandrel 205, the folding fingers 316 slide upon the paper cone carried by the sleeve 300 and tend, under the action of the springs 323, to press the paper into the saw-cuts 301, thus forming the folds 325 shown in Fig. 10. Near the end of their movement, the folding fingers engage in the annular member 308 and are thus wedged into engagement with the saw-cuts of sleeve 300. During this phase of the operation, the ring 313 is spaced from the cross-head 310 a larger distance than shown in Fig. 26. Upon the abutment of the folding fingers 316 against the annular member 308, however, the springs 314 are compressed and the conical face 321 engages the folding fingers 317 and urges the same into the grooves 302, thereby providing the paper sleeve with the folds shown at 326 in Fig. 10. When the folding tool is subsequently withdrawn from the mandrel 205, the parts resume their original position.

While this operation is carried out on the mandrel aligned with the rod 207, the ejecting operation takes place on the mandrel 205 which is in alignment with one of the matrices 211 in the position indicated at 213 in Fig. 5. For this purpose, the rods 306 are advanced by any suitable means and push the ring 305 forward whereby the folded paper sleeve is slipped into the matrix.

The tool for pressing the folds

Fig. 28 illustrates the matrix 211 which is in axial alignment with the tool carried by rod 214 (compare Fig. 21). The rod 214 is provided at its end with a hollow conical member 330 which slidably accommodates a sort of plunger 331 formed with a tapered head 332. The plunger 331 carries a headed bolt 333 surrounded by a coil-spring 334. The head of the bolt normally abuts against a shoulder 335 of the member 330, thus limiting the axial movement of the plunger 331 in the member 330. The plunger is provided with a collar 336 and is surrounded by a plurality of bars 337 of segmental cross-section. These bars are provided with inner recesses engaging over the collar 336 and are kept in engagement with the member 330 by an annular spring coil 338 inserted in peripheral recesses of the segmental bars 337. A similar spring coil 339 serves to keep the segmental bars in engagement with the collar 336.

The operation is as follows: When the rod 214 moves forward, it carries with it the members 330 and 332 until the latter engages the neck of the paper sleeve and presses the folds provided therein firmly against the walls of the reduced interior of the matrix 211. On further advance of the member 330, the conical portion thereof urges the segmental bars 337 apart and presses the same firmly against the paper folds.

The expansible rubber mandrel

The bar 215 (Fig. 21) carries a flanged head 340 of steel to which a disc 341 is attached by screws 342. The disc 341 carries a number of headed bolts 343 adapted to axially guide a ring 344. Springs 345 surround the bolts 343 tending to urge the ring 344 towards the right with reference to Fig. 29. A cylinder 346 is seated with an outer shoulder 347 on the ring 344 and has a flange 348 engaging behind the flange of the head 340. Moreover, the edge of the cylinder is bevelled as indicated at 349 to cooperate with the bevelled edge 350 of the matrix 211. A pin 351 is inserted in an axial boring of the head 340 to project from the front face thereof. A body 352 of circular cross-section and of the shape illustrated in Fig. 29, has an axial hole and is slipped over the pin 351. This body consists of an elastic material, preferably rubber, and is kept in place on the pin 351 by means of a disc 353 arranged on the end of the pin and kept thereon by friction produced by a coil spring 354. The rear mouth of the matrix is provided with a flanged sleeve 355 into which the pin 351 fits snugly.

The operation is as follows: When the bar 215 is moved forward it carries with it the rubber body 352 which will enter the folded paper sleeve and the cylinder 346. Before the body 352 firmly engages the walls of the paper sleeve, the slanting face 349 of the cylinder will abut against the bevelled edge 350 of the matrix and form a close casing therewith, which is kept sealed by action of the springs 345. On further advance, the head 340 will compress the rubber body 352 so that the latter will be expanded in radial direction and firmly press the paper on the wall of the matrix 211.

By this action, the paper plies are firmly united and smoothed, as will easily be appreciated.

It will be noted that the mouth of the matrix 211 is enlarged as indicated at 356 to form a shoulder 357. The expanding rubber body 352 presses the paper plies around the shoulder 357 so as to enlarge the bottom portion of the paper bottle and to form a shoulder therein which constitutes the seat for the flanged bottom disc inserted in the subsequent step, and is indicated at 397 in Fig. 11.

When the head 340 is withdrawn, the rubber body 352 expands and the cylinder 346 is returned to its initial position by the springs 345.

Tool for punching, drawing and inserting the bottom disc

The cross-head 266 attached to the rods 264 and 265 is provided with a central opening 410 which carries a cylindrical punching member 411. The inner diameter of the latter is slightly smaller than the inner diameter of the enlarged end of the paper sleeve and equals the inner diameter of the opening 410. In front of the punching cylinder 411 there is provided a supporting plate 412 formed integral with two vertical bars 413 which are carried by transverse rods 414 and 415 of the frame of the machine. An opening 416 in the supporting plate 412 is lined with a sleeve 417 of hardened steel which has a shoulder 418 kept seated against a corresponding shoulder of the supporting plate by means of a ring 419 attached to the plate 412 by screws, as shown in Fig. 30.

The inner rim of ring 419 is sharpened to cooperate with the punching cylinder 412 and is adapted to punch a circular disc out of a paper web which is intermittently fed in between the two punch members.

The paper web indicated at 420 is guided by a supporting roller 421 carried by a bracket 422 which is attached to the supporting plate 412 by bolts 423. The bracket 422 carries a clamping plate 424 which presses the paper web on the upper face of the bracket under the action of a spring 425. The latter bears against the head of a bolt 426 which passes through a boring in the bracket and is secured into the pressure plate 424, as shown in Fig. 30. The paper web passes around a feeding cylinder 427 journalled in arms 428 of plate 412 and cooperating with a pressure roller 429 which is journalled in slides 430. These slides are guided in rearward projections of the arms 428 and may be adjusted towards and away from the feeding cylinder 427 by setting screws 431. In this manner, the pressure of the roller 429 may be adjusted. The pressure roller is geared to the feeding cylinder by intermeshing gears 432 and 433 keyed on the ends of the respective roller shafts. An intermittent rotation is imparted to the feeding roller 427. For this purpose, the shaft of the roller 427 carries a pinion 434 (Fig. 31) which meshes with a gear 435 journalled on a pivot inserted in one of the arms 428. The gear 435 is attached to a coaxially arranged ratchet wheel 436 which cooperates with the pawl 437 of a pawl-carrier 438. The latter is journalled on the same pivot as the ratchet wheel and is rocked to and fro by a reciprocating link 439.

The main rod 216 carries a suitable plunger (not shown in Fig. 30) which cooperates with the drawing sleeve 416 to provide a disc punched from the web 420 with a flange.

The cross-head 266 carries a straight knife 440 extending across the web and cooperating with a knife 441 attached to the supporting plate 412 for the purpose of dividing the continuous paper web into separate pieces, which drop on an endless belt 442 and are carried above by the same and discharged from the machine. The endless belt is driven in any suitable manner and passes around a cylinder 443 journalled in the arms 413, as shown in Fig. 31.

The operation is as follows: While the plunger carried by the main rod 216 is retained in its rearward position, the rods 264 and 265 advance towards the stationary supporting plate 412 and cause the punching member 411 to enter the punching ring 419. As at this time, the paper web is introduced therebetween, a circular disc will be punched out of the web and is pressed on the end face of the sleeve 417 with a moderate pressure. While the rods 264 and 265 are maintained in their forward position, the main rod 216 carrying the plunger will go forward, and the plunger will enter the opening 410 and the punching member 411 until it engages the paper disc. On its continued forward travel, it will pull the rim of the paper disc out from between the members 411 and 417 and press the rim against the wall of the sleeve 417 so as to form it to a flange. The movement of the plunger is continued until it enters the enlarged end of the paper sleeve positioned to the plunger by the matrix 211.

In Fig. 12, I have shown the flanged bottom disc at 444. The distance of the flange from the rim of the paper sleeve is shown on an exaggerated scale. Practically, this distance corresponds to the width of the marginal zone *g* shown in Fig. 9, which consists of a single ply only. This facilitates the subsequent step of folding the paper rim inwardly over the bottom flange.

The stroke of the main rod 216 is so proportioned that the bottom disc will be firmly pressed on the shoulder 397 (Fig. 11) which seats on the inner shoulder of the matrix. When the rod 216 is subsequently withdrawn, the bottom disc is retained by friction within the paper sleeve. At the same time the cross-head 266 is withdrawn to permit the paper web 420 to be fed another step whereby a new portion of the web will be brought between the cutters 411, 417, 440 and 441.

*Tool for folding the rim of the paper sleeve inwardly over the flange of the bottom disc*

The end of rod 218 is of enlarged diameter as shown at 361, thus forming a shoulder 362. The flanged sleeve 360 mounted on rod 218 is seated against the shoulder and kept in position by a pin 363. The flange 364 of the sleeve forms a base plate for a number of elements arranged for relative axial displacement under the action of springs bearing against the flange 364. One of these elements consists of an annular member 365 to which a number of parallel threaded bolts 366 are attached extending towards the flange 364 and passing through a boring 367 provided therein. The heads of the bolts 366 tend to bear on the flange 364 under the action of coil springs 368 surrounding the bolts between the ring 365 and the flange.

Thus, the ring 365 is guided in axial relation to the rod 218 and tends to remain in the position shown in Fig. 32. An annular plate 369 located inside of the ring 365 engages a recess provided in the latter and is kept in the same by the springs 368. The plate 369 assists in axially guiding a cylinder 370.

The cylinder 370 has a conical end face 371 adapted to cooperate with the bevel edge 350 of the matrix 211 and is provided with a projecting rim 372 which may engage over the matrix to secure accurate alignment. The cylinder 370 is provided with a peripheral collar 373 between its ends and with radial slots extending through the rim 372 and all the way up through the righthand portion of the cylinder and through the collar 373. These slots serve to accommodate and guide folding fingers in the form of sheet metal plates 374 pivoted on pins 375, which are located in the collar and extend through the slots. The configuration of the folding plates 374 will appear from Fig. 32. It will be noted that the corners 376 thereof are adapted to inwardly project beyond the inner surface of the cylinder 370 and that fingerlike projections 377 project into the path of the ring 365 to be engaged thereby.

An annular plate 378 is slidably arranged on the head 361 and provided with a number of recesses 379 to accommodate coil springs 380 which bear against the supporting plate 364 and thus tend to axially shift the annular plate 378 toward the matrix. Headed bolts 381 extending through borings in the supporting plate 364 and screwed into the plate 378 serve to axially guide the latter.

The front face of the plate 378 is provided with an annular recess which accommodates the rear end of a cylindrical member 382. A clearance is provided between the head 361 and the cylinder 382 and the front portion of the latter has a number of longitudinal radial slots extending to the line indicated at 383 and forming a number of segmental fingers 384. A cylindrical sleeve 385 is seated on the rear portion of the cylinder 382 and slidably fitted into the cylinder 370. The folding fingers 384 are so shaped as to provide a clearance 386 between their outer faces and the sleeve 385 and as to provide inner bevelled faces 387 adapted to cooperate with a conical spreading plate 388 axially attached to the head 361 by a screw 389. Moreover, the segmental folding fingers 384 have outwardly projecting pressure heads 390.

A ring 391 is attached by screws 392 to the sleeve 385 and the cylinder 382 and serves to maintain these parts in position. The ring 391 is provided with a number of axial borings 393 arranged in alignment with similar borings provided in the end face of cylinder 370 and accommodating compression springs 394 which tend to move the cylinder 370 towards the matrix. The sleeve 385 is provided with longitudinal guiding slots 395 in which screws 396 engage which are provided in the cylinder 370 and serve to prevent an angular displacement thereof.

The operation is as follows: In the initial position, the plate 378 is kept spaced by the springs 380 from the supporting plate 364 a larger distance than shown in Fig. 32. Therefore, the conical spreading plate 388 does not engage the folding fingers 384 and the latter assume their utmost inner position. In this position, they may enter the enlarged end of the paper sleeve without crimping the same. The cylinder 370 is initially kept by the springs 394 in a forward position in which the folding plates 374 do not inwardly project beyond the inner surface of the cylinder 370.

When the rod 218 advances towards the matrix 211, the cylinder 370 first slips over the rim of the paper sleeve which slightly projects from the mouth of the matrix 211 until its conical face 371 seats on the matrix. On further advance, the cylinder 370 remains stationary in contact with the matrix, while the other parts continue their movement until the ring 365 engages the projections 377 and rocks the folding plates 374 inwardly into the position shown in Fig. 32. Consequently, the folding plates bend the projecting rim of the paper sleeve to inclined position. On further advance of the rod 218, the heads 390 enter between the folding fingers 376 and engage the rim of the paper sleeve and fold the same inwardly over the flange of the inserted bottom disc, until their further advance is checked by their engagement with the shoulder 397 of the paper body which, in its turn, seats on the shoulder 357 of the matrix. On further advance of the rod 218, the springs 380 are compressed so that all of the parts will remain stationary, except for the supporting plate 364 and the head 361 carrying the conical spreading plate 388. The latter will urge apart the segmental fingers 384. Consequently, the pressure heads 390 move outwardly in radial direction and press the inwardly folded rim of the paper sleeve firmly on the flange of the bottom disc.

On the return stroke of rod 218, the parts are returned by the springs 368, 394 and 380 to their initial position in reversed succession. First, the pressure heads 390 move inwardly to disengage the paper. Then, the fingers 385 are withdrawn from the matrix, and finally the cylinder 370 is withdrawn.

*Tool for finishing the inwardly folded lower rim of the paper bottle*

The rod 218 carries a plunger of cylindrical shape adapted to enter into the enlarged end of the paper sleeve to smooth the inwardly folded rim thereof and to firmly unite the same with the bottom flange. This operation is desirable for finishing the lower end of the paper bottle because the pressure heads 390 being of segmental shape with radial slots between them, can not act on the entire inner periphery of the paper sleeve and, therefore, are not capable of making the inner surface of the lower bottle rim as smooth as will be desirable. The plunger carried by rod 218, however, is cylindrical in cross-section without any radial slots and is, therefore, adapted to give the inner surface of the bottle end the desired finish. I may mention at this point that suitable means may be provided for applying adhesive to the zone *g* (Fig. 9) of the paper sleeve to more firmly unites the same with the bottom disc.

As the plunger carried by rod 218 is not of any specific design, but is in the form of an ordinary cylinder, an illustration thereof is deemed unnecessary herewith.

*Tool for shaping the neck of the bottle*

It is to be remembered that the paper sleeves presented to the tools described hereinabove by the matrices 211, are subsequently transferred from the latter to the receiving cylinders 220, a cross-section of which is illustrated in Fig. 33.

The reciprocating rod 223 carries at its end a supporting plate 450 (Fig. 33) provided with a number of bolts 451 extending parallel to its axis. These bolts serve to guide a plate 452 in axial direction which, for this purpose, is provided with sleeves 453 engaging over the bolts 451. A flanged cylinder 454 is connected with the disc 452 to form a casing in which a number of segmental members 455 are suitably guided in radial direction. The inner faces of these members have a peripheral ridge 456. The segmental members 455 are operated in radial direction by rods 457 provided with inclined faces 458 adapted to engage cam faces 459 provided on the segmental members 455. The rods 457 are carried by the plate 450.

A headed pin 460 surrounded by a rubber sleeve 461 is axially attached on a bolt 462 guided in an axial boring 463 of the supporting plate 450, a spring 464 being interposed between the bolt and the walls of the boring. Spacing sleeves 465 and 466 inserted between the rubber sleeve 461 and the supporting plate 450 serve to determine the normal position in which the spring 464 tends to maintain the pin 460 relative to the supporting plate 450.

The operation is as follows:

Initially, the plate 452 is spaced from the supporting plate 450 a larger distance than shown, so that the rods 457 are withdrawn from the casing 454 so as to permit the segmental members 455 to be withdrawn in outward direction by suitable springs, not shown. When the rod 223 advances towards the receiving cylinder 220, the conical faces 467 of the segments engage over the upper end of the bottle, while the tapered end of the pin 460 enters the bottle neck. On the continued travel of the supporting plate 450 towards the left with references to Fig. 33, the inclined faces 458 engage the cam faces 459 and urge the segmental members 455 inwardly. Therefore, the upper end of the paper sleeve is firmly clamped between the segmental members and the rubber sleeve 461 and is given its final shape, as determined by the shape of the segmental members. The ridge 456 of the latter forms the restriction in the bottle neck indicated at 468 in Fig. 14. As a result, an inner shoulder is formed in the bottle neck serving as a seat for a closure disc which may be applied to the bottle to seal the same. At this time, the parts will assume the position shown in Fig. 33.

On the subsequent return stroke of the supporting plate 450, the pin 460 and the cooperating members 455 remain in the position shown, while the rods 457 are withdrawn from the casing 454. During this period, the spring 464 will be compressed. As soon as the segmental members 455 are released and restored to their outer position, the pin 460 will be withdrawn from the bottle neck by action of the spring 464. Coil springs 469 serve to secure the withdrawal of the rods 457 on the return stroke of the plate 450.

The ejector which pulls the finished bottle out of the receiving cylinder 220 on the subsequent step, need not be described, as it offers no point of particular interest. It is formed by a number of leaf-springs which frictionally engage over the rim of the bottle mouth. The operation has been described before.

It will easily be appreciated that some of the tools and other novel elements of my machine may be employed independently from the others, and that a great number of changes may be made in the construction without departing from the spirit of my invention set forth in the appended claims.

However, it is obvious that sheet material other than paper may be employed, although my novel method and the machine described are particularly applicable to paper.

What I claim is:—

1. In the art of manufacturing articles from sector-shaped sheets, the process of successively preparing said sheet and feeding the same to shaping instrumentalities, which comprises intermittently feeding the web to a punching station, punching out of said web a waste portion confined by the adjacent edges of two portions of the desired shape, whereby a sector-shaped sheet is separated from the web, simultaneously punching holes situated along a line in conformity with the rear edge of the sheet to be separated from the web in the subsequent punching operation, engaging the portion separated from the web at the holes punched in the preceding cycle, and feeding said latter portion in the web-feeding direction to said instrumentalities.

2. In a machine for manufacturing paper bottles, a number of mandrels adapted to carry paper sleeves and to successively cooperate with a folding tool and with an ejector, a number of matrices adapted to be charged with the sleeves from said mandrels by the ejector, a plurality of shaping tools adapted to cooperate with and to enter said matrices, an ejector adapted to successively engage said matrices to axially eject the paper sleeve therefrom, a number of receiving cylinders adapted to successively receive the paper sleeves from said matrices by the last-mentioned ejector, a shaping tool adapted to successively enter said receiving cylinders, three revolver discs, one carrying said mandrel, the other carrying said matrices and the third carrying the receiving cylinders, and means to intermittently and simultaneously turn all of said revolver discs and means to operate all of said tools when said revolver discs are at rest.

3. In a machine for manufacturing paper bottles, means to roll a section-shaped paper sheet to a frustro-conical sleeve, a conveyor adapted to receive the paper sleeve from said means, a mandrel adapted to receive the sleeve from said conveyor, a folding tool cooperating with said mandrel and adapted to provide the paper sleeve with longitudinal folds, a matrix adapted to be moved in cooperative relation to said mandrel to receive the folded paper sleeve therefrom, a spreading tool adapted to enter said matrix and to compress the folds of said paper sleeve, means for preparing a flanged bottom disc and adapted to cooperate with said matrix and to insert said bottom disc into the paper sleeve, receiving cylinders adapted to be brought into aligned position relative to said matrix to receive the bottomed paper sleeve therefrom, and a shaping tool adapted to be moved in cooperative relation with said receiving cylinders and to shape the open end of the paper sleeve to a bottle neck.

4. In a machine for manufacturing paper bottles, a conical mandrel provided with longitudinal recesses and adapted to receive a paper sleeve on its peripheral surface, an ejector ring axially movable on said conical mandrel and having its periphery normally engaging the peripheral surface of said mandrel, folding fingers adapted to enter said recesses and means to axially move said ejector ring from engagement with said mandrel, whereby the sleeve will be stripped therefrom.

5. In a machine for manufacturing paper bottles, a conical mandrel having longitudinal recesses and adapted to receive a paper sleeve, a ring coaxially mounted relative to said mandrel and adapted to be moved over the same, a plurality of folding fingers pivotally mounted on said ring for movement into and out of said recesses, an axially guided pushing member adapted to engage the free ends of said fingers to wedge the same into said recesses, and springs positioned between said ring and said pushing member, adapted to transmit axial motion to said ring before said fingers will be operated.

6. In a machine for making a paper receptacle, a device for folding the rim of a paper sleeve inwardly and to press it in contact with the flange of a flanged bottom disc inserted in said sleeve, said device comprising radially movable fingers adapted to engage the rim at spaced circumferential points and to bend the same inwardly, pushing members axially movable into said sleeve and adapted to engage the bent rim and to turn the same back over the flange of the bottom disc, and means for subsequently causing said pushing members to move in radially outward direction for the purpose of pressing the rim of the paper sleeve on said flange.

7. In a machine for making a paper receptacle, a device for folding the rim of a paper sleeve inwardly and to press it in contact with the flange of a flanged bottom disc inserted in said sleeve, said device comprising a ring having a plurality of radial slots, folding fingers pivotally mounted in said slots, a second ring axially movable on said first mentioned ring adapted to engage and to turn said fingers in inward direction, a sleeve slidably guided within said first mentioned ring and divided by a plurality of axial slots in resilient segmental fingers, a spreading member slidably guided within said sleeve and adapted to urge said segmental fingers in radial outward direction, and a plurality of springs tending to maintain said rings, said sleeve and said spreading member in predetermined relative positions.

8. In a machine for manufacturing paper bottles, a device for shaping the bottle neck comprising a plurality of segmental members arranged for radial movement, axially movable means adapted to cooperate with said members and to press the same in radial inward direction, and a body of elastic resilient material surrounded by said segmental members adapted to be inserted into the bottle neck and to take up the pressure exerted thereon by said members.

9. In a machine for manufacturing paper bottles, a device for shaping the bottle neck comprising a casing, a pin centrally mounted therein for axial movement, a rubber sleeve on said pin adapted to be introduced into the bottle neck, a plurality of segmental members slidably mounted in said casing to be movable in radial direction towards and away from said rubber sleeve and a plurality of axially movable elements adapted to exert a camming action on said segmental members to force the same inwardly against the bottle neck positioned over said rubber sleeve.

In testimony whereof I affix my signature.

CARL RISTOW.